United States Patent
Kashima et al.

(10) Patent No.: US 11,584,837 B2
(45) Date of Patent: Feb. 21, 2023

(54) POROUS POLYIMIDE FILM, LITHIUM ION SECONDARY BATTERY, AND ALL-SOLID-STATE BATTERY

(71) Applicant: FUJIFILM Business Innovation Corp., Tokyo (JP)

(72) Inventors: Yasunobu Kashima, Kanagawa (JP); Kosaku Yoshimura, Kanagawa (JP); Hajime Sugahara, Kanagawa (JP); Hidekazu Hirose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 819 days.

(21) Appl. No.: 16/540,060

(22) Filed: Aug. 14, 2019

(65) Prior Publication Data

US 2020/0239656 A1    Jul. 30, 2020

(30) Foreign Application Priority Data

Jan. 29, 2019 (JP) .............................. JP2019-013429

(51) Int. Cl.
| | |
|---|---|
| *H01M 10/00* | (2006.01) |
| *C08J 9/00* | (2006.01) |
| *H01M 10/0525* | (2010.01) |
| *H01M 50/411* | (2021.01) |

(52) U.S. Cl.
CPC ....... *C08J 9/0061* (2013.01); *H01M 10/0525* (2013.01); *H01M 50/411* (2021.01); *C08J 2205/04* (2013.01); *C08J 2205/044* (2013.01); *C08J 2205/05* (2013.01); *C08J 2325/14* (2013.01); *C08J 2333/12* (2013.01); *C08J 2479/08* (2013.01)

(58) Field of Classification Search
CPC .............. C08J 2479/08; C08J 2325/14; H01M 10/0525; H01M 50/414; H01M 50/489; Y02E 60/10
See application file for complete search history.

(56) References Cited

U.S. PATENT DOCUMENTS

| | | | |
|---|---|---|---|
| 10,696,808 B2 | 6/2020 | Nukada et al. | |
| 2012/0114982 A1* | 5/2012 | Mitsuda ............ | H01M 10/0585 429/9 |
| 2018/0244886 A1 | 8/2018 | Nukada et al. | |
| 2020/0199322 A1* | 6/2020 | Sugawara ................ | B05D 3/08 |

FOREIGN PATENT DOCUMENTS

| | | |
|---|---|---|
| JP | 2012-107144 | 6/2012 |
| JP | 2016-183332 | 10/2016 |
| JP | 2017226777 | 12/2017 |
| JP | 2018-138645 | 9/2018 |

OTHER PUBLICATIONS

Office Action of Japan Counterpart Application, with English translation thereof, dated Nov. 29, 2022, pp. 1-6.

* cited by examiner

*Primary Examiner* — Anca Eoff
*Assistant Examiner* — Monique M Wills
(74) *Attorney, Agent, or Firm* — JCIPRNET

(57) ABSTRACT

There is provided a porous polyimide film in which the pore distribution width A represented by the following formula is 1.15 or less, the average pore diameter is within a range of 0.50 μm to 3.0 μm, and the air permeation speed is 30 seconds or less:

$A = (D_{84}/D_{16})^{1/2}$ wherein $D_{16}$ is the pore diameter at 16% cumulation from the small diameter side of pores, and $D_{84}$ is the pore diameter at 84% cumulation from the small diameter side of pores.

15 Claims, 3 Drawing Sheets

POROUS POLYIMIDE FILM, LITHIUM ION SECONDARY BATTERY, AND ALL-SOLID-STATE BATTERY

CROSS-REFERENCE TO RELATED APPLICATIONS

This application is based on and claims priority under 35 USC 119 from Japanese Patent Application No. 2019-013429 filed Jan. 29, 2019.

BACKGROUND

(i) Technical Field

The present disclosure relates to a porous polyimide film, a lithium ion secondary battery, and an all-solid-state battery.

(ii) Related Art

Polyimide resins are materials having excellent characteristics such as mechanical strength, chemical stability, and heat resistance, and a porous polyimide film having such characteristics attracts attention.

For example, Japanese Laid Open Patent Application Publication No. 2012-107144 describes a method for producing a porous polyimide film, the method including producing a varnish by mixing polyamic acid or polyimide, silica particles, and a solvent or producing a varnish by polymerizing polyamic acid or polyimide in a solvent in which silica particles are dispersed, producing a polyimide-silica composite film by forming a film of the produced varnish on a substrate and completing imidization, and removing silica from the produced polyimide-silica composite film. The silica particles used have a sphericity of 1.0 to 1.1, a particle diameter distribution index (d25/d75) of 1.5 or less, and an average diameter of 100 to 2000 nm, and the mass ratio of silica/polyimide in the polyimide-silica composite film is 2 to 6.

Japanese Laid Open Patent Application Publication No. 2018-138645 describes a polyimide precursor solution containing resin particles and a polyimide precursor. In the polyimide precursor solution, the volume particle size distribution of the resin particles has at least one maximum value, and the ratio of the volume frequency of the maximum value with the highest volume frequency to the total volume frequency of the maximum values possessed by the volume particle size distribution is 90% or more and 100% or less.

Japanese Laid Open Patent Application Publication No. 2016-183332 describes a method for producing a porous polyimide film, the method including a first process of forming a coating film which contains a polyimide precursor solution, which contains a polyimide precursor and an organic amine compound dissolved in an aqueous solvent, and resin particles not dissolved in the polyimide precursor solution, and drying the coating film to form a film containing the polyimide precursor and the resin particles; and a second process of imidizing the polyimide precursor by heating the film to form a polyimide film, the second process including treatment of removing the resin particles.

SUMMARY

It has been found that when a usual porous polyimide film is used in, for example, application such as a separator for a lithium ion secondary battery, the battery capacity (may be referred to as "cycle characteristics" hereinafter) may be decreased during repeated charge and discharge.

Aspects of non-limiting embodiments of the present disclosure relate to a porous polyimide film which suppresses a decrease in battery capacity due to repeated charge and discharge when applied to a secondary battery as compared with a porous polyimide film having a pore distribution width exceeding 1.15, a porous polyimide film having a pore diameter of less than 0.50 μm, or a porous polyimide film having an air permeation speed exceeding 30 seconds.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a porous polyimide film wherein in a pore distribution measured by a mercury intrusion method, a pore distribution width represented by the square root $((D_{84}/D_{16})^{1/2})$ of a ratio of pore diameter $D_{84}$ at 84% cumulation from a small diameter side to a pore diameter $D_{16}$ at 16% cumulation from the small diameter side of pores is 1.15 or less, a pore diameter is 0.50 μm or more and 3.0 or less, and an air permeation speed is 30 seconds or less.

BRIEF DESCRIPTION OF THE DRAWINGS

Exemplary embodiments of the present disclosure will be described in detail based on the following figures, wherein.

DETAILED DESCRIPTION

Figure 1:
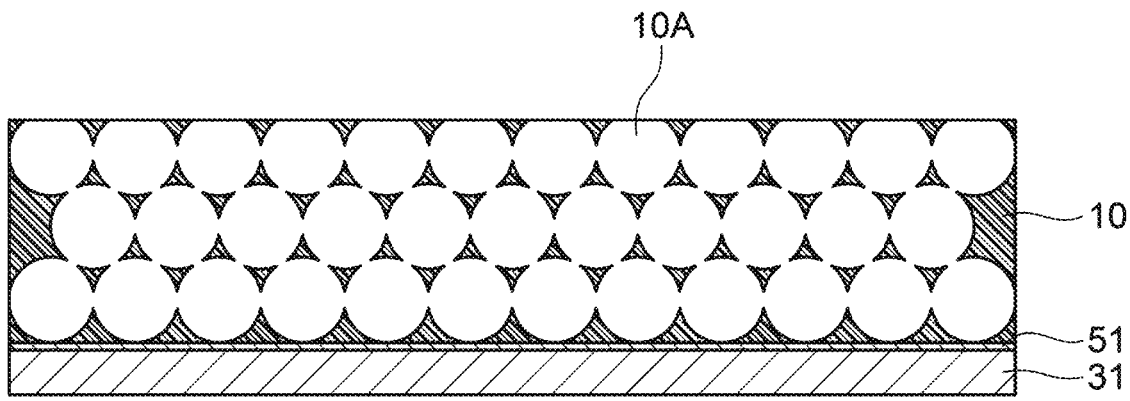
FIG. 1 is a schematic drawing showing an example of a form of a porous polyimide film according to an exemplary embodiment of the present disclosure.

An example of a porous polyimide film according to an exemplary embodiment of the present disclosure is described below.

<Porous Polyimide Film>

A porous polyimide film according to an exemplary embodiment of the present disclosure has a pore distribution measured by a mercury intrusion method, in which the volume based pore distribution width represented by the square root $((D_{84}/D_{16})^{1/2})$ of the ratio of pore diameter $D_{84}$ at 84% cumulation from the small diameter side to the pore diameter $D_{16}$ at 16% cumulation from the small diameter side of pores is 1.15 or less, the pore diameter is 0.50 μm or more and 3.0 μm or less, and the air permeation speed is 30 seconds or less.

Porous films may be used for, for example, application to secondary batteries (a separator for a lithium ion secondary battery, a holding body for a solid electrolyte in an all-solid-state battery, etc.). Research is advanced on porous polyimide films, among the porous films, as a material suitable for application to secondary batteries.

It has been found that when a usual porous polyimide film is used for application such as a separator for a lithium ion secondary battery or the like, the battery capacity (may be referred to as "cycle characteristics" hereinafter) is decreased during repeated charge and discharge. A cause for this is considered to relate to the mobility of lithium ions moving through the porous polyimide film. That is, as a lithium secondary battery is repeatedly charged and discharged, lithium metal grows to a dendrite shape. Therefore, it is considered that the mobility of lithium ions in the porous polyimide film is decreased, thereby decreasing the battery capacity during repeated charge and discharge. Specifically, the following consideration is made. The excessively small pore diameter causes low ion mobility, and thus dendrites easily grow. Also, the porous polyimide film having large variation in pore diameter causes variation in the moving speed of lithium ions through the porous polyimide film, and thus dendrites easily grow. In addition, the low air permeation speed makes dendrites to easily grow due to difficult moving of lithium ions.

On the other hand, the porous polyimide film according to the exemplary embodiment of the present disclosure having the configuration described above has little variation in pores in the porous film and a nearly regular pore arrangement, and thus causes little variation in mobility of lithium ions through the porous polyimide film. In addition, lithium ions easily move through the porous polyimide film. Therefore, it is considered that the growth of dendrites in the porous polyimide film is suppressed during repeated charge and discharge, thereby suppressing a decrease in battery capacity during repeated charge and discharge (excellent cycle characteristics).

The porous polyimide film according to the exemplary embodiment of the present disclosure is described below.

In the exemplary embodiment of the present disclosure, the term "film" represents the concept including not only those generally called "film" but also those generally called "film" and "sheet".

(Characteristics of Porous Polyimide Film)
—Pore Distribution Width—

In a pore distribution measured by a mercury intrusion method, a volume-based pore distribution width is calculated by the square root $((D_{84}/D_{16})^{1/2})$ of the ratio of pore diameter $D_{84}$ at 84% cumulation from the small diameter side to the pore diameter $D_{16}$ at 16% cumulation from the small diameter side of pores. The porous polyimide film according to the exemplary embodiment has a volume-based pore distribution width of 1.15 or less. In view of excellent cycle characteristics, the pore distribution width is preferably 1.13 or less, more preferably 1.12 or less, and still more preferably 1.11. The smaller the pore distribution width is, the sharper the pore diameter width and the more excellent the cycle characteristics. Thus, the lower limit of the pore distribution width may be 1.00 or more, 1.01 or more, or 1.05 or more.

The pore distribution width is measured as follows. First, the porous polyimide film cut into two pieces with a size of 30 mm in width×60 mm in length. The two porous polyimide pieces are superposed to form a specimen for measurement. The pore distribution width of the resultant specimen is measured by a mercury intrusion method according to JIS R 1655 (2003). In order to increase the measurement accuracy, the cut size is 10 μm or more.

—Pore—

The pore diameter is a value represented as an average value. The pore diameter (average value of pore diameters) falls in a range of 0.50 μm or more and 3.0 μm or less. The pore diameter of 0.50 μm or more causes the excellent cycle characteristics. Also, the pore diameter of 3.0 μm or less suppresses a decrease in battery characteristics, such as short circuit and the like. In view of more excellent cycle characteristics, the pore diameter is 0.7 μm or more, preferably 0.75 μm or more, or and more preferably 0.8 μm or more. In view of more suppressing a decrease in battery characteristics, such as short circuit or the like, the pore diameter is 2.5 μm or less, preferably in a range of 2.45 or less, and more preferably 2.4 μm or less.

In view of excellent cycle characteristics, the void ratio is preferably 50% or more and 80% or less. The lower limit of the void ratio is more preferably 55% and still more preferably 60% or more. The upper limit of the void ratio is preferably 75% or less and more preferably 70% or less.

The void ratio of the porous polyimide film according to the exemplary embodiment of the present disclosure is a value determined from the apparent density and true density of the porous polyimide film. The apparent density is a value obtained by dividing the mass (g) of the porous polyimide film by the total volume (cm³) of the porous polyimide film containing pores. The true density p is a value obtained by dividing the mass (g) of the porous polyimide film by the volume (cm³) of the porous polyimide film excluding pores. The void ratio of the porous polyimide film is calculated by the following formula.

Void ratio (%)=$\{1-(d/\rho)\}\times100=[1-\{(w/t)/\rho)\}]\times100$ (Formula)

d: apparent density of porous polyimide film (g/cm³)
ρ: true density of porous polyimide film (g/cm³)
w: weight of porous polyimide film (g/m²)
t: thickness of porous polyimide film (μm)

The circularity of pores is not particularly limited and is, for example, 0.85 or more, preferably 0.9 or more, more preferably 0.92 or more, and still more preferably 0.95 or more in view of excellent cycle characteristics. The pore circularity of 0.85 or more suppresses a decrease in mobility of lithium ions.

The circularly of pores is defined by the formula: circularity=(4πA)0.5/L wherein A is the opening area of the pore to be determined, and L is the outline length of the pore. A perfect circle has a circularity of 1, and the circularity decreases as the peripheral length L increases relative to the sectional area A.

The shape of pores is preferably a spherical shape or a shape near to a spherical shape. The pores are preferably connected to each other (refer to FIG. 1). The pore diameter of a portion where the pores are connected to each other is, for example, ¹⁄₁₀₀ or more and ½ or less, preferably ¹⁄₅₀ or more and ⅓ or less, and more preferably ¹⁄₂₀ or more and ¼ or less, of the maximum diameter of the pores. Specifically, the average value of the pore diameters of the portions where the pores are connected to each other is 5 nm or more and 1500 nm or less.

The ratio (ratio of maximum diameter to minimum diameter of pores) of the pores is not particularly limited and is, for example, 1 or more and 2 or less. The ratio is preferably 1 or more and 1.9 or less and more preferably 1 or more and 1.8 or less. Within this range, the ratio is still more preferably close to 1.

The pore diameter (average value of pore diameters), the average value of pore diameters of portions where the pores are connected to each other, the ratio of maximum diameter to minimum diameter of the pores, and the circularity of the pores are values measured by observation using a scanning electron microscope (SEM). Specifically, first, the porous polyimide film is cut to prepare a measurement sample. The measurement sample is observed and measured by VE SEM manufactured by KEYENCE Corporation using an image processing software provided as standard equipment. The average value of pore diameters (arithmetic average diameter) and the minimum and maximum diameters of the pores are determined by observing and measuring 100 pores in a section of the measurement sample. Also, with respect to the pore diameters of portions where the pores are connected to each other, the average value of pore diameters (arithmetic average diameter) of portions where the pores are connected to each other is determined for 100 pores. When the shape (shape of the pores in a measurement section) of the pores is not a circular shape, the longest portion is considered as the diameter. The circularity of the pores is calculated based on the definition described above using the average value (arithmetic average peripheral length) of peripheral lengths measured for 100 pores.

The ratio of maximum diameter to minimum diameter of the pores and the circularity of the pores within the respective ranges described above are preferred from the viewpoint of suppressing variation in the pore diameter. Also, when the porous polyimide film according to the exemplary embodiment of the present disclosure is applied to, for example, a battery separator of a lithium ion battery, the occurrence of disturbance in an ion flow is suppressed, and thus the formation of lithium dendrites is easily suppressed. The ratio of maximum diameter to minimum diameter of the pores is the ratio represented by a value (that is, maximum diameter/minimum diameter of the pores) obtained by dividing the maximum diameter by the minimum diameter of the pores.

The thickness (average value) of the porous polyimide film is not particularly limited and may be, for example, 10 μm or more and 1000 μm or less. The thickness may be 20 μm or more or 30 μm or more. Also, the thickness may be 500 μm or less or 400 μm or less.

—Air Permeation Speed—

In view of excellent cycle characteristics, the porous polyimide film according to the exemplary embodiment of the present disclosure has an air permeation speed of 30 seconds or less. In view of the same, the air permeation speed is preferably 25 seconds or less and more preferably 20 seconds or less. The lower air permeation speed causes excellent cycle characteristics, and thus the air permeation speed may be a value close to 0 second (over 0 second) or 5 seconds or more. A method for measuring the air permeation speed is described in examples later.

(Method for Producing Porous Polyimide Film)

A desired example of a method for producing the porous polyimide film according to the exemplary embodiment of the present disclosure is described below.

The porous polyimide film according to the exemplary embodiment of the present disclosure is produced, for examples, as follows.

A first process of applying a polyimide precursor solution containing an aqueous solvent containing water, resin particles not dissolved in the aqueous solvent, an organic amine compound, and a polyimide precursor to form a coating film, and then drying the coating film to form a film containing the polyimide precursor and the resin particles.

A second process of imidizing the polyimide precursor by heating the resultant film to form a polyimide film, the second process including treatment of removing the resin particles.

In the specification of the present disclosure, the expression "not dissolved" includes dissolution of an object material within a range of 3% by mass or less in a liquid as an object at 25° C.

In the description of the production method, the same constituent parts shown in FIG. 1 referred to are denoted by the same reference numeral. In FIG. 1, reference numeral 31 denotes a substrate, reference numeral 51 denotes a release layer, reference numeral 10A denotes a pore, and reference numeral 10 denotes a porous polyimide film.

(First Process)

In the first process, first, the polyimide precursor solution (also referred to as the "resin particle dispersed polyimide precursor solution" hereinafter) containing the aqueous solvent, the resin particles, the organic amine compound, and the polyimide precursor is prepared.

Next, the resin particle dispersed polyimide precursor solution is applied on a substrate to form a coating film containing the polyimide precursor solution and the resin particles. Then, the coating film formed on the substrate is dried to form a film containing the polyimide precursor and the resin particles.

A method for forming the coating film, containing the polyimide precursor solution and the resin particles, on the substrate in the first process is not particularly limited and is, for example, the following method.

Specifically, first a resin particle dispersion containing the resin particles dispersed in the aqueous solvent is prepared. Then, the resin particle dispersion is mixed with the organic amine compound, the tetracarboxylic dianhydride, and the diamine compound, and the tetracarboxylic dianhydride and the diamine compound are polymerized to form a polyimide precursor, preparing the resin particle dispersed polyimide precursor solution. Next, the resultant resin particle dispersed polyimide precursor solution is applied on the substrate to form the coating film containing the polyimide precursor solution and the resin particles. In the coating film, the resin particles are disposed in a state where aggregation is suppressed.

The substrate on which the resin particle-dispersed polyimide precursor solution is applied is not particularly limited. Examples thereof include resin-made substrates of polystyrene, polyethylene terephthalate, and the like; glass substrates; ceramic substrates; metal substrates of iron, stainless steel (SUS), and the like; composite material substrates of combination of these materials; and the like. If required, a release layer may be provided on the substrate by, for example, release treatment with a silicone-based or fluorine-based release agent or the like.

A method for applying the resin particle dispersed polyimide precursor solution on the substrate is not particularly limited. Examples thereof include various methods such as a spray coating method, a spin coating method, a roll coating method, a bar coating method, a slit die coating method, an ink jet coating method, and the like.

The amount of the polyimide precursor solution applied for forming the coating film containing the polyimide precursor solution and the resin particles may be set to an amount with which a predetermined film thickness can be obtained.

After the coating film containing the polyimide precursor solution and the resin particles is formed, the coating film is dried to form a film containing the polyimide precursor and the resin particles. Specifically, the coating film containing the polyimide precursor solution and the resin particles is dried by, for example, a method of heat drying, natural drying, vacuum drying, or the like to form the film. More specifically, the film is formed by drying the coating film so that the solvent remaining in the film is 50% or less, preferably 30% or less, relative to the solid content of the film. The film is in a state where the polyimide precursor can be dissolved in water.

(Second Process)

In the second process, the polyimide precursor is imidized by heating the film formed in the first process and containing the polyimide precursor and the resin particles to form a polyimide film. The second process includes treatment of removing the resin particles. The porous polyimide film is formed through the treatment of removing the resin particles.

In the second process, in forming the polyimide film, specifically, imidization is allowed to proceed by heating the film formed in the first process and containing the polyimide precursor and the resin particles, and imidization is allowed to proceed by further heating to form the polyimide film. As imidization proceeds to increase the imidization rate, dissolution in an organic solvent becomes difficult.

In the second process, the treatment of removing the resin particles is performed. The resin particles may be removed in the process of imidizing the polyimide precursor by heating the film or removed from the polyimide film after (after imidization) the completion of imidization.

In the exemplary embodiment of the present disclosure, the process of imidizing the polyimide precursor represents the process of allowing imidization to proceed by heating the film, which is formed in the first process and contains the polyimide precursor and the resin particles, to create a state before the polyimide film is formed after the completion of imidization.

In view of resin particle removability or the like, the treatment of removing the resin particles is preferably performed when the imidization rate of the polyimide precursor in the polyimide film is 10% or more during the process of imidizing the polyimide precursor. With the imidization rate of 10% or more, a state insoluble in an organic solvent is easily created, and thus the form is easily maintained.

Examples of the treatment of removing resin particles include a method of removing the resin particles by heating, a method of removing with an organic solvent which dissolves the resin particles, a method of removing by decomposition of the resin particles with a laser or the like, and the like. Among these, preferred are the method of removing the resin particles by heating and the method of removing by using an organic solvent which dissolves the resin particles.

In the method of removing by heating, the resin particles may be removed by, for example, decomposition by heating for allowing imidization to proceed during the process of imidizing the polyimide precursor. In this case, in view of no operation of removing the resin particles with a solvent, this method is useful for reducing the operations.

The method of removing with an organic solvent which dissolves the resin particles is, for example, a method of removing the resin particles by contact (for example, immersion in the solvent) with the organic solvent which dissolves the resin particles. In this case, immersion in the solvent is desirable in view of increasing the dissolution efficiency of the resin particles.

The organic solvent which dissolves the resin particles and used for removing the resin particles is not particularly limited as long as the organic solvent can dissolve the resin particles but does not dissolve the polyimide film before the completion of imidization and the polyimide film after the completion of imidization. Examples thereof include ethers such as tetrahydrofuran and the like, aromatics such as toluene and the like; ketones such as acetone and the like; esters such as ethyl acetate and the like; and the like.

In the second process, a heating method for allowing imidization to proceed by heating the film, formed in the first process, to form the polyimide film is not particularly limited. For example, a method of heating in two stages can be used. In the case of two-stage heating, specific heating conditions are as follows.

A desired heating condition of the first stage is a temperature at which the shape of the resin particles can be maintained. Specifically, the temperature is, for example, within a range of 50° C. or more and 150° C. or less and preferably within a range of 60° C. or more and 140° C. or less. In addition, a heating time is preferably within a range of 10 minutes or more and 60 minutes or less. The higher the heating temperature, the shorter the heating time may be.

Heating conditions of the second stage are, for example, heating conditions of 150° C. or more and 450° C. or less (preferably 200° C. or more and 430° C. or less) and 20 minutes or more and 120 minutes or less. Under these heating conditions within the respective ranges, imidization reaction further proceeds, and the polyimide film can be formed. In the heating reaction, heating may be performed by increasing the temperature stepwisely or gradually at a constant rate before the temperature reaches the final heating temperature.

The heating conditions are not limited to the conditions of the two-stage heating method, and a method of heating in one stage may be used. In the case of the one-stage heating method, for example, imidization may be completed under only the heating conditions of the second stage described above.

In view of increasing an opening ratio, the resin particles are preferably exposed by treatment of exposing the resin particles in the second process. The treatment of exposing the resin particles in the second process is preferably performed during the process of imidizing the polyimide precursor or after imidization and before the treatment of removing the resin particles.

In this case, for example, when the film is formed on the substrate by using the particle dispersed polyimide precursor solution, the particle dispersed polyimide precursor solution is applied on the substrate to form a coating film in which the resin particles are embedded. Next, the coating film is dried to form the film containing the polyimide precursor and the resin particles. The film formed by this method is in a state where the resin particles are embedded. Before removal of the resin particles, the film may be subjected to the treatment of exposing the resin particles from the polyimide film during the process of imidizing the polyimide precursor by heating or after the completion of imidization (after imidization).

In the second process, the treatment of exposing the resin particles is performed, for example, when the polyimide film has the following state.

In the case of treatment of exposing the resin particles when the imidization rate of the polyimide precursor in the polyimide film is less than 10% (that is, in the state where the polyimide film can be dissolved in water), examples of the treatment of exposing the resin particles embedded in the polyimide film include a treatment of wiping, a treatment of immersion in water, and the like.

In the treatment of exposing the resin particles when the imidization rate of the polyimide precursor in the polyimide film is 10% or more (that is, in a state insoluble in water and the organic solvent) and when the polyimide film is completely imidized, examples of a usable method include a method of exposing the resin particles by mechanically cutting with a tool such as sandpaper or the like and a method of exposing the resin particles by decomposition with a laser or the like.

For example, in the case of mechanical cutting, upper regions (that is, regions of the resin particles on the side apart from the substrate) of the resin particles embedded in the polyimide film are partially cut together with the polyimide film present in the upper portions of the resin particles, and the cut resin particles are exposed from the surface of the polyimide film.

Then, the resin particles are removed, by the resin particle removing treatment described above, from the polyimide film in which the resin particles are exposed. Thus, the porous polyimide film from which the resin particles have been removed can be formed (refer to FIG. 1).

The production of the porous polyimide film subjected to the treatment of exposing the resin particles in the second process is described above, but the treatment of exposing the resin particles may be performed in the first process in view of enhancing an opening ratio. In this case, in the first process of forming the coating film and then drying the coating film to form the film, the resin particles may be exposed by the treatment of exposing the resin particles. The opening ratio of the porous polyimide film is enhanced by the treatment of exposing the resin particles.

For example, in the process of forming the coating film containing the polyimide precursor solution and the resin particles and then drying the coating film to form the film containing the polyimide precursor and the resin particles, as described above, the polyimide precursor in the film is in a state soluble in water. In this state, the resin particles in the film can be exposed by, for example, the treatment of wiping or immersion in water, or the like. Specifically, the polyimide precursor solution present in a region thicker than the thickness of a particle layer is removed by, for example, the treatment of exposing the resin particle layer by wiping with water. Thus, the resin particles present in an upper region (region of the resin particle layer on the side apart from the substrate) of the particle layer are exposed from the surface of the film.

In the use for application such as a gas separation film, the porous polyimide film preferably has a skin layer without openings in the surface thereof. In this case, the treatment of exposing the resin particles is desirably not performed.

In the second process, the substrate used for forming the film in the first process may be separated when the dry film is formed, may be separated when the polyimide precursor in the polyimide film is in a state insoluble in the organic solvent, or may be separated when the film is formed after the completion of imidization.

The porous polyimide film is produced through the processes described above. The porous polyimide film may be post-processed according to purpose of use.

Herein, the imidization rate of the polyimide precursor is described.

Examples of a partially imidized polyimide precursor include precursors having structures each having a repeating unit represented by any one of a general formula (I-1), general formula (I-2), and general formula (I-3) below.

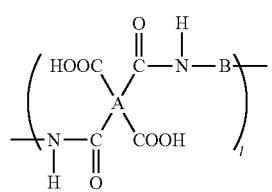

(I-1)

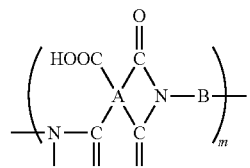

(I-2)

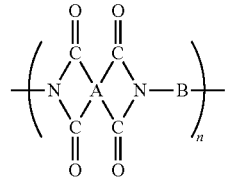

(I-3)

In the general formula (I-1), the general formula (I-2), and the general formula (I-3), A represents a tetravalent organic group, B represents a divalent organic group, l represents an integer of 1 or more, and m and n each independently represent 0 or an integer of 1 or more.

In addition, A and B represent the same meanings as A and B, respectively, in a general formula (I) described later.

The imidization rate of the polyimide precursor represents the ratio of the number $(2n+m)$ of imide ring-formed bond parts to the total number of bond parts $(2l+2m+2n)$ in bond parts (reaction parts between tetracarboxylic dianhydride and diamine compound) of the polyimide precursor. That is, the imidization rate of the polyimide precursor is represented by "$(2n+m)/(2l+2m+2n)$".

The imidization rate of the polyimide precursor (value of "$(2n+m)/(2l+2m+2n)$") is measured by the following method.

—Measurement of Imidization Rate of Polyimide Precursor—

• Formation of Polyimide Precursor Sample (i) A polyimide precursor composition to be measured is applied in a thickness within a range of 1 μm or more and 10 μm or less on a silicone wafer to form a coating film sample.

(ii) The solvent in the coating film sample is substituted by tetrahydrofuran (THF) by immersing the coating film sample in tetrahydrofuran (THF) for 20 minutes. The solvent for immersion is not limited to THF and can be selected from solvents which do not dissolve the polyimide precursor but are miscible with the solvent component contained in the polyimide precursor composition. Usable examples thereof include alcohol solvents such as methanol, ethanol, and the like, and ether compounds such as dioxane and the like.

(iii) The coating film sample is taken out from THF, and THF adhering to the surface of the coating film sample is removed by spraying $N_2$ gas. Then, the coating film sample is dried by treatment for 12 hours or more under a reduced pressure of 10 mmHg or less within a range of 5° C. or more and 25° C. or less, forming a polyimide precursor sample.

• Formation of 100% Imidized Standard Sample (iv) Similarly to the above (i), the polyimide precursor composition to be measured is applied on a silicone wafer to form a coating film sample.

(v) Imidization reaction is performed by heating the coating film sample at 380° C. for 60 minutes to form a 100% imidized standard sample.

• Measurement and Analysis (vi) An infrared absorption spectrum of each of the 100% imidized standard sample and the polyimide precursor sample is measured by using a Fourier transform infrared spectrophotometer (manufactured by Horiba Ltd. FT-730). In the 100% imidized standard sample, the ratio I'(100) of the absorption peak (Ab'(1780 cm$^{-1}$)) due to an imide bond near 1780 cm$^{-1}$ to the absorption peak (Ab'(1500 cm$^{-1}$) due to an aromatic ring near 1500 cm$^{-1}$ is determined.

(vii) Similarly, in measurement of the polyimide precursor sample, the ratio I(x) of the absorption peak (Ab (1780 cm$^{-1}$)) due to an imide bond near 1780 cm$^{-1}$ to the absorption peak (Ab (1500 cm$^{-1}$) due to an aromatic ring near 1500 cm$^{-1}$ is determined.

By using the measured absorption peaks I'(100) and I(x), the imidization rate of the polyimide precursor is calculated based on the following formulae.

Imidization rate of polyimide precursor=$I(x)/I'(100)$   Formula:

$I'(100)=(Ab'(1780\ cm^{-1}))/(Ab'(1500\ cm^{-1}))$   Formula:

$I(x)=(Ab(1780\ cm^{-1}))/(Ab(1500\ cm^{-1}))$   Formula:

The measurement of the imidization rate of the polyimide precursor is applied to measurement of the imidization rate of an aromatic polyimide precursor. In measurement of the imidization rate of an aliphatic polyimide precursor, a peak due to a structure not changed before and after imidization reaction is used as an internal standard peak in place of the aromatic ring absorption peak.

Next, each of the components in the polyimide precursor for producing the porous polyimide film according to the exemplary embodiment of the present disclosure is described.

(Polyimide Precursor Solution)

The polyimide precursor solution contains the aqueous solvent, the resin particles, the organic amine compound, and the polyimide precursor. A method for preparing the polyimide precursor solution is not particularly limited. A desired example of the method for preparing the polyimide precursor solution is the following method.

First, a resin particle dispersion is prepared by dispersing the resin particles in the aqueous solvent. The resin particles preferably have acid groups on the surface thereof. Next, the polyimide precursor is produced by polymerizing, in the resin particle dispersion, the tetracarboxylic dianhydride with the diamine compound in the presence of the organic amine compound.

Specifically, the method includes preparing the resin particle dispersion in which the resin particles are dispersed (may be referred to as "preparation of the resin particle dispersion" hereinafter), and forming the polyimide precursor by mixing the resin particle dispersion with the organic amine compound, the tetracarboxylic dianhydride, and the diamine compound and polymerizing the tetracarboxylic dianhydride with the diamine compound (may be referred to as "formation of the polyimide precursor" hereinafter). The same applies to the case using resin particles having acid groups in the surfaces thereof.

—Preparation of Resin Particle Dispersion—

A method for preparing the resin particle dispersion is not particularly limited as long as the method can produce the resin particle dispersion containing the resin particles dispersed in the aqueous solvent.

An example of the method includes weighing the resin particles which are not dissolved in the polyimide precursor solution and have acid groups in the surfaces thereof and the aqueous solvent for the resin particle dispersion, and then mixing and stirring the resin particles and the aqueous solvent. A method for mixing and stirring the resin particles and the aqueous solvent is not particularly limited. An example of the method includes mixing the resin particles while stirring the aqueous solvent. Also, in view of enhancing the dispersibility of the resin particles, for example, at least one of an ionic surfactant and a nonionic surfactant may be mixed.

Also, the resin particle dispersion may be a resin particle dispersion prepared by forming the resin particles in the aqueous solvent. When the resin particles are formed in the aqueous solvent, the resin particle dispersion may be prepared by polymerizing a monomer component in the aqueous solvent. In this case, the dispersion may be one prepared by a known polymerization method. For example, when the resin particles are vinyl resin particles, a known polymerization method (a radical polymerization method such as emulsion polymerization, soap-free emulsion polymerization, suspension polymerization, mini-emulsion polymerization, micro-emulsion polymerization, or the like) can be used.

For example, when the emulsion polymerization method is applied to production of the vinyl resin particles, a monomer having a vinyl group, such as styrene, (meth)acrylic acid, or the like is added to water in which a water-soluble polymerization initiator such as potassium persulfate, ammonium persulfate, or the like has been dissolved. Further, if required, a surfactant such as sodium dodecylsulfate, diphenyl oxide disulfonate salt, or the like is added and subjected to polymerization by heating under stirring to produce the vinyl resin particles. The monomer having a vinyl group, such as styrene, (meth)acrylic acid, or the like may be added at once (one-stage addition) or may be divided into plural portions and added (multi-stage addition). From the viewpoint of obtaining the pore diameter of the porous polyimide film according to the exemplary embodiment of the present disclosure, the monomer is preferably added in plural stages. In addition, the vinyl resin having acid groups in the surface thereof can be produced by using a monomer having an acid group as the monomer component.

The method for preparing the resin particle dispersion is not limited to the above, and a commercial product using an aqueous solvent may be used as the resin particle dispersion. In the use of the commercial product as the resin particle dispersion, an operation such as dilution with an aqueous solvent or the like may be performed according to purpose of use. Further, an organic solvent in the resin particle dispersion may be substituted by an aqueous solvent within a range which causes no influence on dispersibility.

(Resin Particle)

The resin particles are not particularly limited as long as they are not dissolved in the aqueous solvent and not dissolved in the polyimide precursor solution, but the resin particles are composed of a resin other than polyimide. Examples thereof include resin particles produced by polycondensation of a polymerizable monomer, such as polyester resins, urethane resins, and the like; and resin particles produced by radical polymerization of a polymerizable monomer, such as vinyl resins, olefin resins, fluorocarbon resins, and the like. Examples of the resin particles produced by radical polymerization include those of (meth)acrylic resins, (meth)acrylate ester resins, styrene-(meth)acryl resins, polystyrene resins, polyethylene resins, and the like.

Among these, the resin particles are preferably composed of at least one resin selected from the group consisting of (meth)acrylic resins, (meth)acrylate ester resins, styrene-(meth)acrylic resins, and polystyrene resins.

In addition, the resin particles may be crosslinked or not be crosslinked. In view of effective contribution to relaxion of residual stress in the imidization of the polyimide precursor, the uncosslinked resin particles are preferred. Further, in view of simplification of the preparation of the resin particle dispersed polyimide precursor solution, the resin particle dispersion is more preferably a vinyl resin dispersion prepared by emulation polymerization.

In the exemplary embodiment of the present disclosure, the meaning of "(meth)acrylic" includes both "acrylic" and "methacrylic".

When the resin particles are vinyl resin particles, the resin particles are produced by polymerizing a monomer. The monomer of the vinyl resin is, for example, a monomer described below. Examples thereof include vinyl resin units produced by polymerizing monomers, such as styrene, alkyl-substituted styrene (for example, α-methylstyrene, 2-methylstyrene, 3-methylstyrene, 4-methylstyrene, 2-ethylstyrene, 3-ethylstyrene, 4-ethylstyrne, and the like), halogen-substituted styrene (for example, 2-chlorostyrene, 3-chlorostyrene, 4-chlorostyrene, and the like); styrenes each having a styrene skeleton, such as vinylnaphthalene and the like; (meth)acrylic acid esters such as methyl (meth)acrylate, ethyl (meth)acrylate, n-propyl (meth)acrylate, n-butyl (meth)acrylate, lauryl (meth)acrylate, 2-ethylhexyl (meth)acrylate, trimethylolpropane trimethacrylate (TMPTMA), and the like; vinylnitriles such as acrylonitrile, methacrylonitrile, and the like; vinyl ethers such as vinyl methyl ether, vinyl isobutyl ether, and the like; vinyl ketones such as vinyl methyl ketone, vinyl ethyl ketone, vinyl isopropenyl ketone, and the like; acids such as (meth)acrylic acid, maleic acid, cinnamic acid, fumaric acid, vinylsulfonic acid, and the like; bases such as ethyleneimine, vinylpyridine, vinylamine, and the like; and the like.

A monofunctional monomer such as vinyl acetate or the like, a difunctional monomer such as ethylene glycol dimethacrylate, nonane diacrylate, decanediol diacrylate, or the like, or a polyfunctional monomer such as trimethylolpropane triacrylate, trimethylolpropane trimethacrylate, or the like may be used in combination.

Also, the vinyl resin may be a resin produced by using the monomers alone or a copolymer resin produced by using two or more monomers.

When an acid group is introduced into the surfaces of the resin particles, the acid group possessed by the surfaces of the resin particles is not particularly limited. The acid group may be, for example, at least one selected from the group consisting of a carboxyl group, a sulfonate group, and a phenolic hydroxyl group. Among these, a carboxyl group is preferred.

The monomer for introducing an acid group into the surfaces of the resin particles is not particularly limited as long as it has an acid group. Examples thereof include a monomer having a carboxyl group, a monomer having a sulfonate group, a monomer having a phenolic hydroxyl group, and salts thereof.

Specific examples thereof include monomers having a sulfonate group, such as p-styrenesulfonic acid, 4-vinylbenzenesulfonic acid, and the like; monomers having a phenolic hydroxyl group, such as 4-vinyldihydrocinnamic acid, 4-vinylphenol, 4-hyroxy-3-methoxy-1-propenylbenzene, and the like; monomers having a carboxyl group, such as acrylic acid, crotonic acid, methacrylic acid, 3-methylcrotonic acid, fumaric acid, maleic acid, 2-methylisocrotonic acid, 2,4-hexadienedioic acid, 2-pentenic acid, sorbic acid, citraconic acid, 2-hexenoic acid, monoethyl fumarate, and the like; and salts thereof. The monomer having an acid group may be mixed and polymerized with a monomer not having an acid group, or after a monomer not having an acid group is polymerized to form particles, the monomer having an acid group may be polymerized on the surfaces of the particles. In addition, these monomers may be used alone or in combination of two or more.

Among these, acrylic acid, crotonic acid, methacrylic acid, 3-methylcrotonic acid, fumaric acid, maleic acid, 2-methylisocrotonic acid, 2,4-hexadienedioic acid, 2-pentenic acid, sorbic acid, citraconic acid, 2-hexenoic acid, monoethyl fumarate, and the like; and salts thereof are preferred as the monomer having a carboxyl group. These monomers having a carboxyl group may be used alone or in combination of two or more.

That is, the resin particles having acid groups in the surfaces thereof preferably have a skeleton derived from at least one monomer having a carboxyl group, selected from the group consisting of acrylic acid, crotonic acid, methacrylic acid, 3-methylcrotonic acid, fumaric acid, maleic acid, 2-methylisocrotonic acid, 2,4-hexadienedioic acid, 2-pentenic acid, sorbic acid, citraconic acid, 2-hexenoic acid, monoethyl fumarate, and the like; and salts thereof.

When the monomer having an acid group is mixed and polymerized with a monomer not having an acid group, the amount of the monomer having an acid group is not particularly limited. From the viewpoint of improving the dispersibility of the resin particles in the polyimide precursor solution and suppressing the occurrence of an aggregate of a polymer in emulsion polymerization, the amount of the monomer having an acid group is preferably 0.3% by mass or more and 20% by mass or less, more preferably 0.5% by mass or more and 15% by mass or less, and particularly preferably 0.7% by mass or more and 10% by mass or less relative to the total of the monomers.

When the monomer not having an acid group is emulsion polymerized, and then the monomer having an acid group is further added and polymerized, from the same viewpoint as described above, the amount of the monomer having an acid group is preferably 0.01% by mass or more and 10% by mass or less, more preferably 0.05% by mass or more and 7% by mass or less, and particularly preferably 0.07% by mass or more and 5% by mass or less relative to the total of the monomers.

As described above, the uncrosslinked resin particles are more preferred. However, when the resin particles are crosslinked, a crosslinking agent is used as at least a portion of the monomer component. In this case, the ratio of the crosslinking agent to the total monomer components is preferably 0% by mass or more and 20% by mass or less, more preferably 0% by mass or more and 5% by mass or less, and particularly preferably 0% by mass.

The monomer used for the resin constituting the vinyl resin particles contains styrene, the ratio of styrene to the total monomer components is preferably 20% by mass or more and 100% by mass or less and more preferably 40% by mass or more and 100% by mass or less.

The average particle diameter of the resin particles is not particularly limited. The average particle diameter of the resin particles is, for example, within a range of 0.50 μm or more and 3.0 μm or less. The average particle diameter of the resin particles is 0.7 μm or more, preferably 0.75 μm or more, and more preferably 0.8 μm or more. Also, the average particle diameter is 2.5 μm or less, preferably 2.45 μm or less, and more preferably 2.4 μm or less.

The average particle diameter of the resin particles is determined by using the particle size distribution measured with a laser diffraction particle size distribution analyzer (for example, COULTER COUNTER LS13 described above, manufactured by Beckman Coulter, Inc.). In this case, a volume-based cumulative distribution is drawn vs. divided particle diameter ranges (channels) from the small particle diameter side. The particle diameter at 50% cumulation of the total particles is measured as the volume average particle diameter D50v.

The resin particles may be produced by further polymerizing a monomer having an acid group on the surfaces of a commercial product. Specific examples of the crosslinked resin particles include crosslinked polymethyl methacrylate (MBX-series, manufactured by Sekisui Plastics Co., Ltd.), crosslinked polystyrene (SBX-series, manufactured by Sekisui Plastics Co., Ltd.), methyl methacrylate-styrene copolymer crosslinked resin particles (MSX-series, manufactured by Sekisui Plastics Co., Ltd.), and the like.

Examples of the uncrosslinked resin particles include polymethyl methacrylate (MB-series, manufactured by Sekisui Plastics Co., ltd.), (meth)acrylate ester-styrene copolymer (FS-series, manufactured by Nipponpaint Co., Ltd.), and the like.

The content of the resin particles in the polyimide precursor solution is within a range of 20% by mass or more and 120% by mass or less (preferably 25% by mass or more and 100% by mass or less and more preferably 30% by mass or more and 90% by mass or less) relative to 100 parts by mass of the solid content of the polyimide precursor in the polyimide precursor solution.

—Formation of Polyimide Precursor—

Next, the resin (polyimide precursor) is produced by polymerizing, in the resin particle dispersion, the tetracarboxylic dianhydride with the diamine compound in the presence of the organic amine compound, preparing the polyimide precursor solution.

This method has high productivity because of the use of the aqueous solvent. Also, the polyimide precursor solution is produced in one stage. Therefore, the method is useful in view of simplification of the process.

Specifically, the prepared resin particle dispersion is mixed with the organic amine compound, the tetracarboxylic dianhydride, and the diamine compound. Then, in the resin particle dispersion, the polyimide precursor is formed by polymerizing the tetracarboxylic dianhydride with the diamine compound in the presence of the organic amine. The same method is used when the resin particles having acid groups in the surfaces thereof are used as the resin particles. In addition, the order of mixing the resin particle dispersion with the organic amine compound, the tetracarboxylic dianhydride, and the diamine compound is not particularly limited.

When the tetracarboxylic dianhydride is polymerized with the diamine compound in the resin particle dispersion containing the resin particles dispersed therein, the polyimide precursor may be formed by using directly the aqueous solvent in the resin particle dispersion. If required, the aqueous solvent may be newly mixed. When the aqueous solvent is newly mixed, the aqueous solvent may be one containing a small amount of an aprotic polar solvent. In addition, other additives may be mixed according to purpose.

The method described above produces the polyimide precursor solution (may be referred to as the "resin particle-dispersed polyimide precursor solution" hereinafter) in which the resin particles are dispersed and which contains the aqueous solvent, the resin particles, the organic amine compound, and the polyimide precursor.

(Aqueous Solvent Containing Water)

When the tetracarboxylic dianhydride is polymerized with the diamine compound in the resin particle dispersion, the aqueous solvent in the resin particle dispersion used for preparing the resin particle dispersion may be directly used as the aqueous solvent. Also, when the tetracarboxylic dianhydride is polymerized with the diamine compound, the aqueous solvent may be prepared so as to be suitable for polymerization.

The aqueous solvent contains water. Specifically, the aqueous solvent is a solvent containing 50% by mass or more of water relative to the total aqueous solvent. Examples of water include distilled water, ion exchanged water, ultrafiltered water, pure water, and the like.

The content of water is preferably 50% by mass or more and 100% by mass or less, 70% by mass or more and 100% by mass or less, and sill more preferably 80% by mass or more and 100% by mass or less relative to the total aqueous solvent.

The aqueous solvent used for preparing the resin particle dispersion contains water. Specifically, the aqueous solvent for the resin particle dispersion is preferably an aqueous solvent containing 50% by mass or more of water relative to the total aqueous solvent. Examples of water include distilled water, ion exchanged water, ultrafiltered water, pure water, and the like. When the aqueous solvent contains a water-soluble organic solvent other than water, for example, a water-soluble alcohol solvent may be used. The "water-soluble" represents that 1% by mass or more of an object substance is dissolved in water at 25° C.

When the aqueous solvent contains a solvent other than water, the solvent other than water is, for example, a water-soluble organic solvent or an aprotic polar solvent. From the viewpoint of transparency, mechanical strength, and the like of the polyimide formed product, a water-soluble organic solvent is preferred as the solvent other than water. In particular, from the viewpoint of improving the characteristics of the polyimide formed product, such as heat resistance, solvent resistance etc. in addition to transparency and mechanical strength, the aqueous solvent may contain an aprotic polar solvent. In this case, in order to prevent dissolution and swelling of the resin particles in the resin particle dispersed polyimide precursor solution, the amount is 40% by mass or less and preferably 30% by mass or less relative to the total aqueous solvent. Also, in order to suppress dissolution and swelling of the resin particles when the film is formed by drying the polyimide precursor solution, the aprotic polar solvent is used at 5% by mass or more and 300% by mass or less, preferably 5% by mass or more and 250% by mass or less, and more preferably 5% by mass or more and 200% by mass or less relative to the solid content of the polyimide precursor in the polyimide precursor solution. The "water-soluble" represents that 1% by mass or more of an object substance is dissolved in water at 25° C.

The water-soluble organic solvents may be used alone or in combination of two or more.

The water-soluble organic solvent is preferably one which does not dissolve the resin particles described below. The reason for this is that for example, when the aqueous solvent contains water and the water-soluble organic solvent, it is concerned that the resin particles are dissolved during film formation even if the resin particles are not dissolved in the resin particle dispersion. However, the water-soluble organic solvent may be used in combination within a range where dissolution and swelling of the resin particles can be suppressed during film formation.

A water-soluble ether solvent is a solvent having an ether bond in one molecule thereof. Examples of the water-soluble ether solvent include tetrahydrofuran (THF), dioxane, trioxane, 1,2-dimethoxyethane, diethylene glycol dimethyl ether, diethylene glycol diethyl ether, and the like. Among these, tetrahydrofuran and dioxane are preferred as the water-soluble ether solvent.

A water-soluble ketone solvent is a water-soluble solvent having a ketone group in one molecule. Examples of the water-soluble ketone solvent include acetone, methyl ethyl ketone, cyclohexanone, and the like. Among these, acetone is preferred as the water-soluble ketone solvent.

A water-soluble alcohol solvent is a water-soluble solvent having an alcoholic hydroxyl group in one molecule. Examples of the water-soluble alcohol solvent include methanol, ethanol, 1-propanol, 2-propanol, tert-butyl alcohol, ethylene glycol, ethylene glycol monoalkyl ethers, propylene glycol, propylene glycol monoalkyl ethers, diethylene glycol, diethylene glycol monoalkyl ethers, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, 1,2,6-hexanetriol and the like. Among these, methanol, ethanol, 2-propanol, ethylene glycol, ethylene glycol monoalkyl ethers, propylene glycol, propylene glycol monoalkyl ethers, diethylene glycol, and diethylene glycol monoalkyl ethers are preferred as the water-soluble alcohol solvent.

When an aprotic polar solvent other than water is contained as the aqueous solvent, the aprotic polar solvent used in combination is a solvent having a boiling point of 150° C. or more and 300° C. or less and a dipole moment of 3.0 D or more 5.0 D or less. Examples of the aprotic polar solvent include N-methyl-2-pyrrolidone (NMP), N,N-dimethylformamide (DMF), N,N-dimethylacetamide (DMAc), dimethyl sulfoxide (DMSO), hexamethylene phosphoramide (HMPA), N-methylcaprolactam, N-acetyl-2-pyrrolidone, 1,3-dimethyl-2-imidazolidinone (DMI), N,N'-dimethylpropylene urea, tetramethyl urea, trimethyl phosphate, triethyl phosphate, and the like.

When a solvent other than water is contained as the aqueous solvent, the solvent used in combination has a boiling point of 270° C. or less, preferably 60° C. or more and 250° C. or less, and more preferably 80° C. or more and 230° C. or less. When the solvent used in combination has a boiling point within the range, the solvent other than water hardly remains in the polyimide film, and the polyimide film having high mechanical strength can be easily produced.

The range where the polyimide precursor is dissolved in the solvent is controlled according to the water content and the type and amount of the organic amine compound. Within the range of low water contents, the polyimide precursor is easily dissolved within the range where the content of the organic amine compound is low. Conversely, within the range of high water contents, the polyimide precursor is easily dissolved within a range where the content of the organic amine compound is high. Also, when the organic amine compound has a hydroxyl group and high hydrophilicity, the polyimide precursor is easily dissolved within the range of high water contents.

(Polyimide Precursor)

The polyimide precursor can be produced by polymerizing the tetracarboxylic dianhydride with the diamine compound. Specifically, the polyimide precursor is a resin (polyamic acid) having a repeating unit represented by a general formula (I).

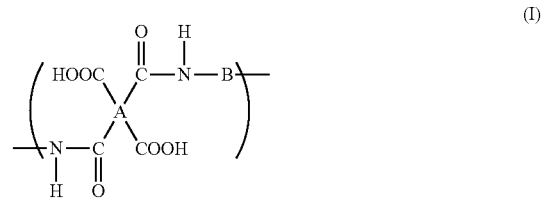

(In the formula (I), A represents a tetravalent organic group, and B represents a divalent organic group.)

In the general formula (I), a tetravalent organic group represented by A is a residue after removal of the four carboxyl groups from the tetracarboxylic dianhydride used as a raw material.

On the other hand, a divalent organic group represented by B is a residue after removal of two amino groups from the diamine compound used as a raw material.

That is, the polyimide precursor having a repeating unit represented by the general formula (I) is a polymer of the tetracarboxylic dianhydride and the diamine compound.

The tetracarboxylic dianhydride may be either an aromatic or aliphatic compound, but an aromatic compound is preferred. That is, in the general formula (I), the tetravalent organic group represented by A is preferably an aromatic organic group.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboyphenoxy)diphenyl sulfide dianhydride, 4 4'-bis(3,4-dicarboxyphenoxy)diphenylsulfone dianhydride, 4,4'-bis(3, 4-dicarboxyphenoxy)diphenylpropane dianhydride, 3,3',4, 4'-perfluoroisopropylidene diphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis (triphenylphthalic acid) dianhydride, m-phenylene-bis (triphenylphthalic acid) dianhydride, bis(triphenylphthalic acid)-4,4'-diphenyl ether dianhydride, bis(triphenylphthalic acid)-4,4'-diphenylmethane dianhydride, and the like.

Examples of the aliphatic tetracarboxylic dianhydride include aliphatic or alicyclic tetracarboxylic dianhydrides such as butanetetracarboxylic dianhydride, 1,2,3,4-cyclobutanetetracarboxylic dianhydride, 13-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetahydrofuryl)-3-methyl-3-cyclohexene-1,2-dicarboxylic dianhydride, bicyclo[2,2,2]-oct-7-ene-2,3,5,6-tetracarboxylic dianhydride, and the like; aliphatic tetracarboxylic dianhydrides each having an aromatic ring, such as 1,3,3a,4,5,9b-hexahydro-2,5-dioxo-3-furanyl)-naphtho [1,2-c]furan-1,3-dione, 1,3,3a,4,5,9b-hexahydro-5-methyl-5-(tetrahydro-2,5-dioxo-3-furanyl)-naphto[1,2-c] furan-1,3-dione, 1,3,3a,4,5,9b-hexahydro-8-methyl-5-(tetrahydro-2,5-dioxo-3-furanyl)-naphtho[1,2-c]furan-1,3-dione, and the like; and the like.

Among these, an aromatic tetracarboxylic dianhydride is preferred as the tetracarboxylic dianhydride, and, specifically, for example, pyromellitic dianhydride, 3,3',4,4'-biphenyltetracarboxylic dianhydride, 2,3,3',4'-biphenyltetracarboxylic dianhydride, 3,3',4,4'-biphenylether tetracarboxylic dianhydride, and 3,3',4,4'-benzophenone tetracarboxylic dianhydride are preferred, pyromellitic dianhydride, 3,3',4,4'-biphenyltetracarboxylic dianhydride, and 3,3',4,4'-benzophenone tetracarboxylic dianhydride are more preferred, and 3,3',4,4'-biphenyltetracarboxylic dianhydride is particularly preferred.

These tetracarboxylic dianhydrides may be used alone or in combination of two or more.

In the use of combination of two or more types, aromatic tetracarboxylic dianhydrides or aliphatic tetracarboxylic dianhydrides may be used in combination, or an aromatic tetracarboxylic dianhydride and an aliphatic tetracarboxylic dianhydrides may be used in combination.

On the other hand, the diamine compound has two amino groups in its molecular structure. The diamine compound may be either an aromatic or aliphatic compound, but an aromatic compound is preferred. That is, in the general formula (I), the divalent organic group represented by B is preferably an aromatic organic group.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-bis[4-(4-amino-2-trifluoromethyl)phenoxy]-octafluorobiphenyl, and the like; aromatic diamines such as diaminotetrafluorothiophene and the like, each having two amino groups bonded to an aromatic ring and a heteroatom other than the nitrogen atoms of the amino groups; aliphatic diamines and alicyclic diamines such as 1,1-meta-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylene diamine, hexahydro-4,7-metanoindanylene dimethylene diamine, tricyclo[6,2,1,0$^{2,7}$]-undecylene dimethyldiamine, 4,4'-methylene bis(cyclohexylamine), and the like; and the like.

Among these, the diamine compound is preferably an aromatic diamine compound, and specifically, for example, p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone are preferred, and 4,4'-diaminodiphenyl ether and p-phenylenediamine are particularly preferred.

These diamine compounds may be used alone or in combination of two or more. In the use of combination of two or more, aromatic diamine compounds or aliphatic diamine compounds may be used in combination, or an aromatic diamine compound and an aliphatic diamine compound may be used in combination.

The number average molecular weight of the polyimide precursor is preferably 1,000 or more and 150,000 or less, more preferably 5,000 or more and 130,000 or less, and still more preferably 10,000 or more and 100,000 or less.

With the polyimide precursor having a number average molecular weight within the range, a decrease in solubility of the polyimide precursor in a solvent is suppressed, thereby easily securing film formability.

The number average molecular weight of the polyimide precursor is measured by gel permeation chromatography (GPC) under measurement conditions described below.

Column: Tosoh TSK gel α-M (7.8 mm I.D×30 cm)
Eluent: DMF (dimethylformamide)/30 mM LiBr/60 mM phosphoric acid
Flow rate: 0.6 mL/min
Injection amount: 60 μL
Detector: RI (differential refractive index detector)

The content (concentration) of the polyimide precursor relative to the whole of the polyimide precursor solution is 0.1% by mass or more and 40% by mass or less, preferably 0.5% by mass or more and 25% by mass or less, and more preferably 1% by mass or more and 20% by mass or less.

(Organic Amine Compound)

The organic amine compound is a compound which increases the solubility of the polyimide precursor in the aqueous solvent by forming an amine salt of the polyimide precursor (carboxyl group thereof) and which functions as an imidization promoter. Specifically, the organic amine compound is preferably a compound having a molecular weight of 170 or less. The organic amine compound is preferably a compound except for the diamine compound used as the raw material of the polyimide precursor.

The organic amine compound is preferably a water-soluble compound. The term "water-soluble" represents that 1% by mass or more of an object material is dissolved in water at 25° C.

The organic amine compound is, for example, a primary amine compound, a secondary amine compound, or a tertiary amine compound.

Among these, the organic amine compound is preferably at least one (particularly, the tertiary amine compound) selected from the secondary amine compound and the tertiary amine compound. When the tertiary amine compound or secondary amine compound (particularly, the tertiary amine compound) is applied as the organic amine compound, it is possible to easily increase the solubility of the polyimide precursor in the solvent, easily improve film formability, and easily improve the storage stability of the polyimide precursor solution.

The organic amine compound is, for example, a divalent or higher polyvalent amine compound other than a monovalent amine compound. When a divalent or higher polyvalent amine compound is applied, a pseudo-crosslinked structure is easily formed between polyimide precursor molecules, and the storage stability of the polyimide precursor solution is easily improved.

Examples of the primary amine compound include methylamine, ethylamine, n-propylamine, isopropylamine, 2-ethanolamine, 2-mino-2-methyl-1-propanol, and the like.

Examples of the secondary amine compound include dimethylamine, 2-(methylamino)ethanol, 2-(ethylamino) ethanol, morpholine, and the like.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, and the like.

From the viewpoint of the pot life of the polyimide precursor solution and film thickness uniformity, the tertiary amine compound is preferred. From this viewpoint, more preferred is at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

From the viewpoint of film formability, the organic amine compound is also preferably an amine compound (particularly, a tertiary amine compound) having a heterocyclic structure containing nitrogen. Examples of the amine compound (hereinafter, referred to as the "nitrogen-containing heterocyclic amine compound") having a heterocyclic structure containing nitrogen include isoquinolines (compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), morpholines (amine compounds having a morpholine skeleton), polyaniline, polypyridine, polyamine, and the like.

From the viewpoint of film formability, the nitrogen-containing heterocyclic amine compound is preferably at least one selected from the group consisting of morpholines, pyridines, piperidines, and imidazoles, and more preferably morpholines (amine compounds having a morpholine skeleton). Among these, more preferably is at least one selected from the group consisting of N-methylmorpholine, N-methylpiperidine, pyridine, 1,2-dimethylimidazole, 2-ethyl-4-methylimidazole, and picoline, and still more preferably is N-methylmorpholine.

Among these, the organic amine compound is preferably a compound having a boiling point of 60° C. or more (preferably 60° C. or more and 200° C. or less and more preferably 70° C. or more and 150° C. or less). With the organic amine compound having a boiling point of 60° C. or more, evaporation of the organic amine compound from the polyimide precursor solution is suppressed, and a decrease in solubility of the polyimide precursor in the solvent is easily suppressed.

The content of the organic amine compound is preferably 50 mol % or more and 500 mol % or less, more preferably 80 mol % or more and 250 mol % or less, and still more preferably 90 mol % or more and 200 mol % or less relative to carboxyl groups (—COOH) of the polyimide precursor in the polyimide precursor solution.

When the content of the organic amine compound is within the range, it is possible to easily increase the solubility of the polyimide precursor in the aqueous solvent, easily improve film formability, and easily improve the storage stability of the polyimide precursor solution.

These organic amine compounds may be used alone or in combination of two or more.

(Other Additives)

In the method for preparing the polyimide precursor solution according to the exemplary embodiment of the present disclosure, the polyimide precursor solution may contain a catalyst for promoting imidization reaction, and a leveling agent for improving film quality, etc.

Examples of the catalyst for promoting imidization reaction include acid catalysts such as a dehydrant such as an acid anhydride or the like, a phenol derivative, a sulfonic acid derivative, a benzoic acid derivative, and the like.

Also, for example, a conductive material (for example, conductivity (for example, a volume resistivity of less than $10^7$ Ω·cm or semiconductivity (for example, a volume resistivity of $10^7$ Ω·cm or more and $10^{13}$ Ω·cm or less)) added for imparting conductivity may be contained.

Examples of the conductive material include carbon black (for example, acid carbon black at pH 5.0 or less); metals (for example, aluminum, nickel, and the like); metal oxides (for example, yttrium oxide, tin oxide, and the like); ion-conductive materials (for example, potassium titanate, LiCl, and the like); and the like. These conductive materials may be used alone or in combination of two or more.

Also, the polyimide precursor solution may contain the inorganic particles added for improving mechanical strength according to the purpose of use. Examples of the inorganic particles include particle materials such as a silica powder, an alumina powder, a barium sulfate powder, a titanium oxide powder, mica, talc, and the like.

[Application of Porous Polyimide Film]

Examples of applications of the porous polyimide film according to the exemplary embodiment of the present disclosure include a separator for secondary batteries such as a lithium battery and the like; a holding body of a solid electrolyte in an all-solid-state battery; a separator for electrolytic capacitors; an electrolyte film of a fuel cell or the like; a battery electrode material; a gas or liquid separation film; a low-dielectric-constant material; a filter membrane; and the like.

When the porous polyimide film according to the exemplary embodiment of the present disclosure is applied to, for example, a separator of a secondary battery such as a lithium ion battery or the like, or a holding body of a solid electrolyte in an all-solid-state battery, little variation occurs in mobility of lithium ions in the porous polyimide film, thereby causing excellent mobility of lithium ions in the porous polyimide film. Therefore, a decrease in battery capacity during repeated charge and discharge is suppressed by the function of suppressing the growth of dendrites in the porous polyimide film during repeated charge and discharge.

<Separator of Lithium Ion Secondary Battery and Lithium Ion Secondary Battery>

Next, description is made of a separator of a lithium ion secondary battery and a lithium ion secondary battery to each of which the porous polyimide film according to the exemplary embodiment of the present disclosure is applied.

A separator of a lithium ion secondary battery according to an exemplary embodiment of the present disclosure contains the porous polyimide film according to the exemplary embodiment of the present disclosure. Also, a lithium ion secondary battery according to an exemplary embodiment of the present disclosure contains the porous polyimide film according to the exemplary embodiment of the present disclosure. Description is made below with reference to FIG. 2.

Figure 2:
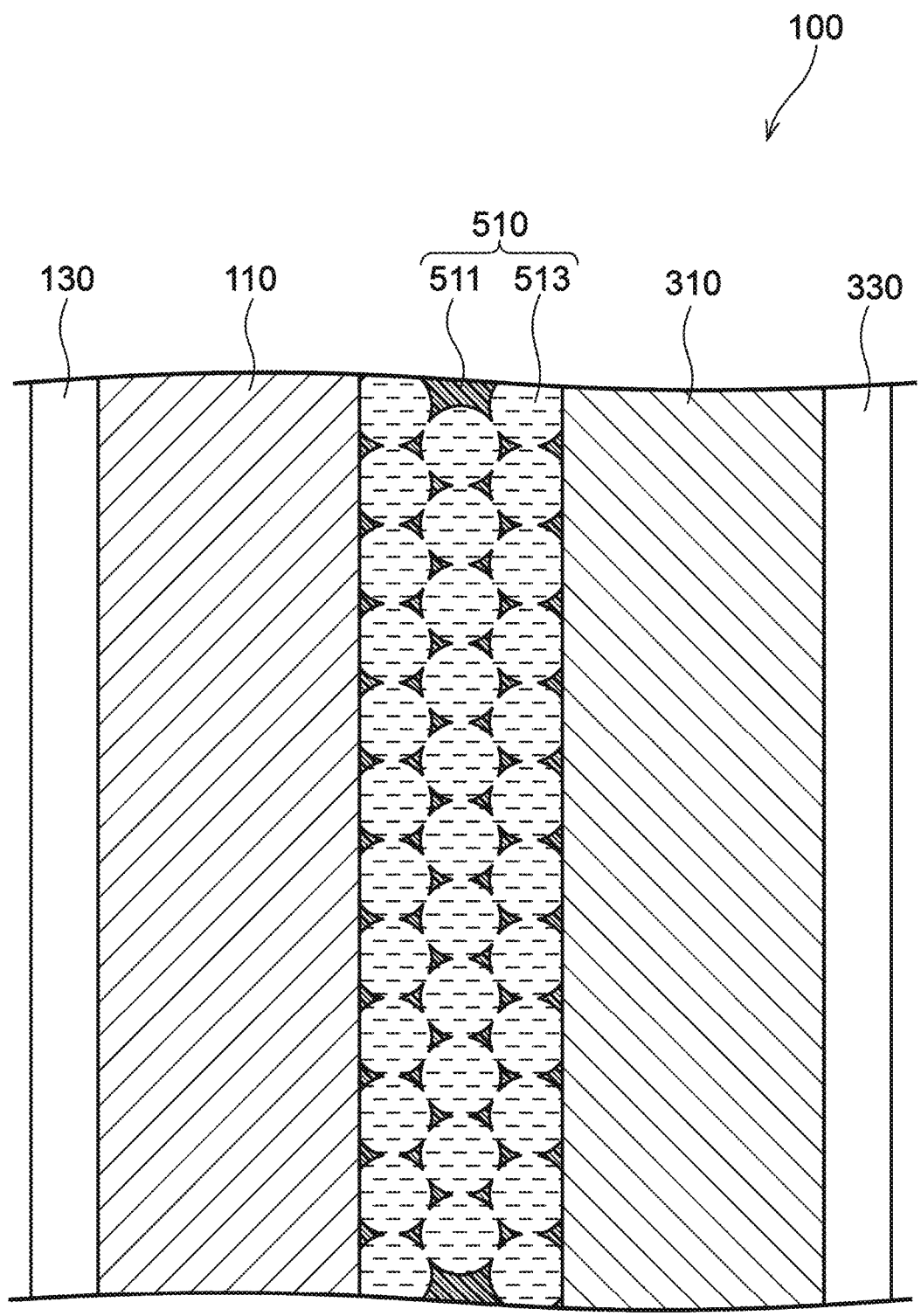
FIG. 2 is a schematic partial sectional view showing an example of a lithium ion secondary battery according to an exemplary embodiment of the present disclosure.

FIG. 2 is a partial schematic sectional view showing an example of the lithium ion secondary battery according to the exemplary embodiment of the present disclosure. As shown in FIG. 2, a lithium ion secondary battery 100 includes a positive electrode active material layer 110, a separator layer 510, and a negative electrode active material 310, which are housed in an outer member not shown in the drawing. The positive electrode active material layer 110 is provided on a positive electrode current collector 130, and the negative electrode active material layer 310 is provided on a negative electrode current collector 330. The separator layer 510 is provided so as to separate between the positive electrode active material layer 110 and the negative electrode active material layer 310 and is disposed between the positive electrode active material layer 110 and the negative electrode active material layer 310 so that the positive electrode active material layer 110 and the negative electrode active material layer 310 face each other. The separator layer 510 includes a separator 511 and an electrolytic solution 513 filled in pores of the separator 511. The porous polyimide film according to the exemplary embodiment of the present disclosure is applied to the separator 511. The positive electrode current collector 130 and the negative electrode current collector 330 are members provided according to demand.

(Positive Electrode Current Collector 130 and Negative Electrode Current Collector 330)

Materials used for the positive electrode current collector 130 and the negative electrode current collector 330 are not particularly limited as long as they are known conductive materials. Usable examples thereof include metals such as aluminum, copper, nickel, titanium, and the like.

(Positive Electrode Active Material Layer 110)

The positive electrode active material layer 110 is a layer containing a positive electrode active material. If required, the positive electrode active material layer 110 may contain known additives such as a conductive auxiliary agent, a binder resin, etc. The positive electrode active material is not particularly limited, and a known positive electrode active material can be used. Examples thereof include lithium-containing composite oxides ($LiCoO_2$, $LiNiO_2$, $LiMnO_2$, $LiMn_2O_4$, $LiFeMnO_4$, $LiV_2O_5$, and the lie), lithium-containing phosphate salts ($LiFePO_4$, $LiCoPO_4$, $LiMnPO_4$, $LiNiPO_4$, and the like), conductive polymers (polyacetylene, polyaniline, polypyrrole, polythiophene, and the like), and the like. The positive electrode active materials may be used alone or in combination of two or more.

(Negative Electrode Active Material Layer 310)

The negative electrode active material layer 310 is a layer containing a negative electrode active material. If required, the negative electrode active material layer 310 may contain known additives such as a binder resin etc. The negative electrode active material is not particularly limited, and a known negative electrode active material can be used. Examples thereof include carbon materials (graphite (natural graphite and artificial graphite), carbon nanotubes, graphitized carbon, low-temperature fired carbon, and the like), metals (aluminum, silicon, zirconium, titanium, and the like), metal oxides (tin dioxide, lithium titanate, and the like), and the like. The negative electrode active materials may be used alone or in combination of two or more.

(Electrolytic Solution 513)

The electrolytic solution 513 is, for example, a nonaqueous electrolytic solution containing an electrolyte and a nonaqueous solvent.

Examples of the electrolyte include electrolytes of lithium salts ($LiPF_6$, $LiBF_4$, $LiSbF_6$, $LiAsF_6$, $LiClO_4$, $LiN(FSO_2)_2$, $LiN(CF_3SO_2)_2$, $LiN(C_2F_5SO_2)$, $LiC(CF_3SO_2)_3$, and the like). The electrolytes may be used alone or in combination of two or more.

Examples of the nonaqueous solvent include cyclic carbonates (ethylene carbonate, propylene carbonate, butylene carbonate, and the like), chain carbonates (diethyl carbonate, dimethyl carbonate, ethylmethyl carbonate, methyl acetate, ethyl acetate, methyl propionate, ethyl propionate, γ-butyrolactone, 1,2-dimethoxyethane, 1,2-diethoxyethane, and the like). The nonaqueous solvents may be used alone or in combination of two or more.

(Method for Producing Lithium Ion Secondary Battery 100)

An example of the method for producing the lithium ion secondary battery 100 is described.

First, a coating solution for forming the positive electrode active material layer 110 containing the positive electrode active material is applied and dried on the positive electrode current collector 130 to produce a positive electrode including the positive electrode active material layer 110 provided on the positive electrode current collector 130.

Similarly, a coating solution for forming the negative electrode active material layer 310 containing the negative electrode active material is applied and dried on the negative electrode current collector 330 to produce a negative electrode including the negative electrode active material layer 310 provided on the negative electrode current collector 330. If required, each of the positive electrode and the negative electrode may be compressed.

Next, the separator 511 is disposed between the positive electrode active material layer 110 of the positive electrode and the negative electrode active material layer 310 of the negative electrode so that the positive electrode active material layer 110 of the positive electrode and the negative electrode active material layer 310 of the negative electrode face each other, forming a laminated structure. In the laminated structure, the positive electrode (the positive electrode current collector 130 and the positive electrode active material layer 110), the separator layer 510, and the negative electrode (the negative electrode active material layer 310 and the negative electrode current collector 330) are laminated in that order. If required, laminated structure may be compressed.

Next, the laminated structure is housed in an outer member, and then the electrolytic solution 513 is injected into the laminated structure. The injected electrolytic solution 513 also permeates into the pores of the separator 511.

Thus, the lithium ion secondary battery 100 is produced.

The lithium ion secondary battery according to the exemplary embodiment of the present disclosure is described above with reference to FIG. 2. However, the lithium ion secondary battery according to the exemplary embodiment of the present disclosure is not limited to this. The form thereof is not particularly limited as long as the porous polyimide film according to the exemplary embodiment of the present disclosure is applied.

<All-Solid-State Battery>

Figure 3:
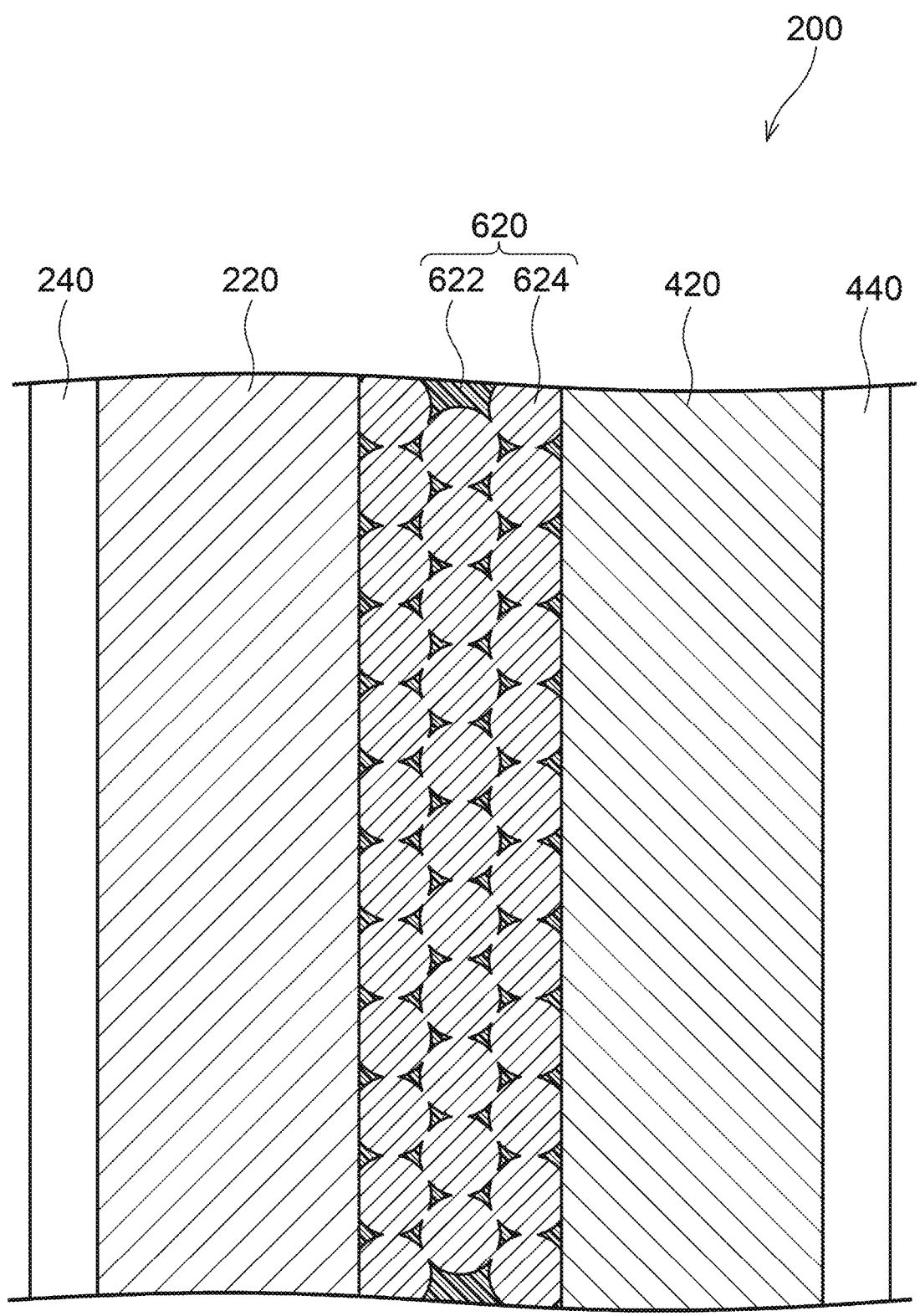
FIG. 3 is a schematic partial sectional view showing an example of an all-solid-state battery according to an exemplary embodiment of the present disclosure.

Next, an all-solid-state battery using the porous polyimide film according to the exemplary embodiment of the present disclosure is described blow with reference to FIG. 3.

FIG. 3 is a partial schematic sectional view showing an example of the all-solid-state battery according to the exemplary embodiment of the present disclosure. As shown in FIG. 3, an all-solid-state battery 200 includes a positive electrode active material layer 220, a solid electrolyte layer 620, and a negative electrode active material layer 420, which are housed in an outer member not shown in the drawing. The positive electrode active material layer 220 is provided on a positive electrode current collector 240, and the negative electrode active material layer 420 is provided on a negative electrode current collector 440. The solid electrolyte layer 620 is disposed between the positive electrode active material layer 220 and the negative electrode active material layer 420 so that the positive electrode active material layer 220 and the negative electrode active material layer 420 face each other. The solid electrolyte layer 620 includes a solid electrolyte 624 and a holding body 622 which holds the solid electrolyte 624, and the pores of the holding body 622 are filled with the solid electrolyte 624. The porous polyimide film according to the exemplary embodiment of the present disclosure is applied as the holding body 622 which holds the solid electrolyte 624. The positive electrode current collector 240 and the negative electrode current collector 440 are members provided according to demand.

(Positive Electrode Current Collector 240 and Negative Electrode Current Collector 440)

Examples of the materials used for the positive electrode current collector 240 and the negative electrode current collector 440 include the same materials as those described above for the lithium ion secondary battery.

(Positive Electrode Active Material Layer 220 and Negative Electrode Active Material Layer 420)

Examples of the materials used for the positive electrode active material layer 220 and the negative electrode active material layer 420 include the same materials as those described above for the lithium ion secondary battery.

(Solid Electrolyte 624)

The solid electrolyte 624 is not particularly limited, and a known solid electrolyte can be used. Examples thereof include a polymer solid electrolyte, an oxide solid electrolyte, a sulfide solid electrolyte, a halide solid electrolyte, a nitride solid electrolyte, and the like.

Examples of the polymer solid electrolyte include, but are not limited to, fluorocarbon resins (homopolymers such as polyvinylidene fluoride, polyhexafluoropropylene, polytetrafluoroethylene, and the like, copolymers each having these as constituent units, and the like), polyethylene oxide resins, polyacrylonitrile resins, polyacrylate resins, and the like. The sulfide solid electrolyte is preferably contained in view of excellent lithium ion conductivity. In view of the same, the sulfide solid electrolyte containing, as a constituent element, at least one of sulfur, lithium, and phosphorus is preferably used.

The oxide solid electrolyte is not particularly limited and, for example, particles of a lithium-containing oxide solid electrolyte can be used. Examples thereof include $Li_2O$—$B_2O_3$—$P_2O_5$, $Li_2O$—$SiO_2$, and the like.

The sulfide solid electrolyte is not particularly limited, and the sulfide solid electrolyte containing, as a constituent element, at least one of sulfur, lithium, and phosphorus can be used. Examples thereof include $8Li_2O.67Li_2S.25P_2S_5$, $Li_2S$, $P_2S_5$, $Li_2S$—$SiS_2$, $LiI$—$Li_2S$—$SiS_2$, $LiI$—$Li_2S$—$P_2S_5$, $LiI$—$Li_3PO_4$—$P_2S_5$, $LiI$—$Li_2S$—$P_2O_5$, $LiI$—$Li_2S$—$B_2S_3$, and the like.

Examples of the halide solid electrolyte include LiI and the like.

Examples of the nitride solid electrolyte include $Li_3N$ and the like.

(Method for Producing the all-Solid-State Battery 200)

An example of a method for producing the all-solid-state battery 200 is described.

A coating solution for forming the positive electrode active material layer 220 containing a positive electrode active material is applied and dried on the positive electrode current collector 240 to produce a positive electrode including the positive electrode active material layer 220 provided on the positive electrode current collector 240.

Similarly, a coating solution for forming the negative electrode active material layer 420 containing a negative electrode active material is applied and dried on the negative electrode current collector 440 to produce a negative electrode including the negative electrode active material layer 420 provided on the negative electrode current collector 440.

If required, each of the positive electrode and the negative electrode may be compressed.

Next, a coating solution for forming the solid electrolyte layer 620, which contains the solid electrolyte 624, is applied and dried on a substrate to form a layered solid electrolyte.

Next, a porous polyimide film serving as the holding body 622 and the layered solid electrolyte 624 are superposed as a material for forming the solid electrolyte layer 620 on the positive electrode active material layer 220 of the positive electrode. Further, the negative electrode is superposed on the material for forming the solid electrolyte layer 620 so that the negative electrode active material layer 420 of the negative electrode faces the positive electrode active material layer 220 side, forming a laminated structure. In the laminated structure, the positive electrode (the positive electrode current collector 240 and the positive electrode active material layer 220), the solid electrolyte layer 620, and the negative electrode (the negative electrode active material layer 420 and the negative electrode current collector 440) are laminated in that order.

Next, by compressing the laminated structure, the solid electrolyte 624 is impregnated into the pores of the porous polyimide film serving as the holding body 622, and the solid electrolyte 624 is held.

Next, the laminated structure is housed in an outer member.

Thus, the all-solid-state battery 200 is produced.

The all-solid-state battery according to the exemplary embodiment of the present disclosure is described above with reference to FIG. 3, the all-soli-state battery is not limited to this. The form is not particularly limited as long as the porous polyimide film according to the exemplary embodiment of the present disclosure is applied.

EXAMPLES

Examples are described below, but the present disclosure is not limited to these examples. In addition, in description below, "parts" and "%" are on mass basis unless otherwise specified.

[Preparation of Resin Particle Dispersion]

—Preparation of Resin Particle Dispersion (1)—

First, 1000 parts by mass of styrene, 20 parts by mass of acrylic acid, 3.0 parts by mass of surfactant DOWFAX 2A1 (47% solution, manufactured by Dow Chemical Company), and 576 parts by mass of ion exchange water are mixed and then stirred and emulsified by a dissolver at 1,500 revolutions for 30 minutes, forming a monomer emulsion.

In a reactor, 1.10 parts by mass of DOWFAX 2A1 (47% solution, manufactured by Dow Chemical Company) and 1270 parts by mass of ion exchange water are added. The resultant mixture is heated to 75° C. in a nitrogen stream, and then 5 parts by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 180 minutes and further reacted for 180 minutes. Then, the reaction solution is cooled to produce a resin particle dispersion (1) as a dispersion of styrene-(meth)acrylic resin particles.

The resultant resin particles have an average particle diameter of 0.55 µm. The average particle diameter is the volume-average particle diameter measured by the method described above (the same applies below).

—Preparation of Resin Particle Dispersions (2) to (6)—

The resin particle dispersions (2) to (6) are prepared by the same method as for preparing the resin particle dispersion (1) except that according to Table 1, the type and amount of the monomer are changed, the amount and type of the emulsion are adjusted, and the average particle diameter is changed. In preparing the resin particle dispersion (2), the amount of the monomer emulsion first added is 4 parts by mass, and in preparing the resin particle dispersion (3), the amount of the monomer emulsion first added is 3 parts by mass. Also, in preparing the resin particle dispersions (4) to (6), in place of the monomer emulsion, 25 parts by mass of the resin particle dispersion (1) is added for preparing the resin particle dispersion (4), 10 parts by mass of the resin particle dispersion (1) is added for preparing the resin particle dispersion (5), and 5 parts by mass of the resin particle dispersion (1) is added for preparing the resin particle dispersion (6).

—Preparation of Resin Particle Dispersion (7)—

First, 670 parts by mass of methyl methacrylate, 2.0 parts by mass of surfactant DOWFAX 2A1 (47% solution, manufactured by Dow Chemical Company), and 670 parts by mass of ion exchange water are mixed and then stirred and emulsified by a dissolver at 1,500 revolutions for 30 minutes, forming a monomer emulsion.

In a reactor, 1.10 parts by mass of DOWFAX 2A1 (47% solution, manufactured by Dow Chemical Company), and 1500 parts by mass of ion exchange water are added. The resultant mixture is heated to 75° C. in a nitrogen stream, and then 1 part by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 220 minutes and further reacted for 50 minutes. Next, a solution prepared by mixing 5 parts by mass of methacrylic acid with 10 parts by mass of ion exchange water is added dropwise over 5 minutes and reacted for 150 minutes. Then, the reaction solution is cooled to produce a resin particle dispersion (7) as a dispersion of methacrylic resin particles having acid groups in the surfaces thereof.

The resultant resin particles have an average particle diameter of 0.85 µm.

—Preparation of Resin Particle Dispersion (8)—

In a reactor, 670 parts by mass of styrene, 25.0 parts by mass of surfactant DOWFAX 2A1 (47% solution, manufactured by Dow Chemical Company), and 670 parts by mass of ion exchange water are mixed and then stirred and emulsified by a dissolver at 1,500 revolutions for 30 minutes, forming a monomer emulsion. Then, 1.10 parts by mass of DOWFAX 2A1 (47% solution, manufactured by Dow Chemical Company), and 1500 parts by mass of ion exchange water are added. The resultant mixture is heated to 75° C. in a nitrogen stream, and then 1 part by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 220 minutes and further reacted for 50 minutes. Next, a solution prepared by mixing 5 parts by mass of sodium 4-vinylbenzenesulfonate (abbreviated as "VBS") with 10 parts by mass of ion exchange water is added dropwise over 5 minutes and reacted for 150 minutes. Then, the reaction solution is cooled to produce a resin particle dispersion (8) as a dispersion of styrene resin particles having acid groups in the surfaces thereof.

The resultant resin particles have an average particle diameter of 0.85 µm.

—Preparation of Comparative Resin Particle Dispersion (C1)—

First, 1000 parts by mass of styrene, 4 parts by mass of surfactant DOWFAX 2A1 (47% solution, manufactured by Dow Chemical Company), and 576 parts by mass of ion exchange water are mixed and then stirred and emulsified by a dissolver at 1,500 revolutions for 30 minutes, forming a monomer emulsion.

Then, 1.10 parts by mass of DOWFAX 2A1 (47% solution, manufactured by Dow Chemical Company), and 1270 parts by mass of ion exchange water are added to a reactor. The resultant mixture is heated to 75° C. in a nitrogen stream, and then 5 part by mass of the monomer emulsion is added to the mixture. Then, the remaining monomer emulsion is added dropwise over 180 minutes and further reacted for 180 minutes. Next, the reaction solution is cooled to produce a resin particle dispersion (C1) as a dispersion of styrene resin particles.

The resultant resin particles have an average particle diameter of 0.48 µm.

—Preparation of Comparative Resin Particle Dispersion (C2)—

First, 1000 parts by mass of styrene, 60 parts by mass of methacrylic acid, 3 parts by mass of surfactant DOWFAX 2A1 (47% solution, manufactured by Dow Chemical Company), and 576 parts by mass of ion exchange water are mixed and then stirred and emulsified by a dissolver at 1,500 revolutions for 30 minutes, forming a monomer emulsion.

Then, 1.10 parts by mass of DOWFAX 2A1 (47% solution, manufactured by Dow Chemical Company), and 1270 parts by mass of ion exchange water are added to a reactor. The resultant mixture is heated to 75° C. in a nitrogen stream, and then 5 part by mass of the monomer emulsion is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 180 minutes and further reacted for 180 minutes. Next, the reaction solution is cooled to produce a resin particle dispersion (C2) as a dispersion of styrene-(meth)acrylic resin particles.

The resultant resin particles have an average particle diameter of 0.55 µm.

—Preparation of Comparative Resin Particle Dispersion (C3)—

First, 1000 parts by mass of styrene, 25.0 parts by mass of surfactant DOWFAX 2A1 (47% solution, manufactured by Dow Chemical Company), and 576 parts by mass of ion exchange water are mixed and then stirred and emulsified by a dissolver at 1,500 revolutions for 30 minutes, forming a monomer emulsion.

Then, 1.10 parts by mass of DOWFAX 2A1 (47% solution, manufactured by Dow Chemical Company), and 1270 parts by mass of ion exchange water are added to a reactor. The resultant mixture is heated to 75° C. in a nitrogen stream, and then 3 part by mass of the resin particle dispersion (1) is added to the mixture. Then, a polymerization initiator solution prepared by dissolving 15 parts by mass of ammonium persulfate in 98 parts by mass of ion exchange water is added dropwise over 10 minutes. After reaction for 50 minutes after dropwise addition, the remaining monomer emulsion is added dropwise over 180 minutes and further reacted for 180 minutes. Next, the reaction solution is cooled to produce a resin particle dispersion (C3) as a dispersion of styrene resin particles.

The resultant resin particles have an average particle diameter of 3.20 μm.

[Preparation of Resin Particle Dispersed Polyimide Precursor Solution (PAA-9)]

A resin particle dispersed polyimide precursor solution (PAA-9) is prepared by the same method as for preparing the resin particle dispersed polyimide precursor solution (PAA-1) except that a mixture of 25.0 g of N-methylpyrrolidone (aprotic polar solvent) ad 25.0 g of N-methylmorpholine (organic amine compound) is added in place of 25.0 g of N-methylmorpholine (organic amine compound).

[Preparation of Resin Particle Dispersed Polyimide Precursor Solutions (PAA-10) to (PAA-16)]

Each of resin particle dispersed polyimide precursor solutions (PAA-10) to (PAA-16) for forming a porous polyimide film of each of the examples is prepared by the same method as for preparing the resin particle dispersed polyimide

TABLE 1

| | | Resin particle dispersion No. | | | | | | | | | | |
|---|---|---|---|---|---|---|---|---|---|---|---|---|
| | | 1 | 2 | 3 | 4 | 5 | 6 | 7 | 8 | C1 | C2 | C3 |
| Monomer composition (parts by mass) | St | 1000 | 1000 | 1000 | 1000 | 1000 | 1000 | | 670 | 1000 | 1000 | 1000 |
| | MMA | | | | | | | 670 | | | | |
| | AA | 20 | 20 | 20 | 20 | 20 | | | | | | |
| | MA | | | | | | 20 | | | | | |
| | MAA | | | | | | | 5 | | | 60 | |
| | VBS | | | | | | | | 5 | | | |
| Average particle diameter (μm) | | 0.55 | 0.70 | 0.85 | 1.20 | 2.50 | 2.85 | 0.85 | 0.85 | 0.48 | 0.55 | 3.20 |

Details of abbreviations in Table 1 are described below.
"St": styrene
"MMA": methyl methacrylate
"AA": acrylic acid
"MA": maleic acid
"MAA": methacrylic acid
"VBS": sodium 4-vinylbenzenesulfonate

[Preparation of Resin Particle Dispersed Polyimide Precursor Solution (PAA-1)]

Resin particle dispersion (1): prepared by adding ion exchange water to 100 g of resin particles in terms of solid content and adjusting the solid content concentration of the resin particles to 20% by mass. To the resin particle dispersion, 9.59 g (88.7 millimoles) of p-phenylenediamine (molecular weight: 108.14) and 25.58 g (86.9 millimoles) of 3,3',4,4'-biphenyltetracarboxylic dianhydride (molecular weight: 294.22) are added and dispersed by stirring at 20° C. for 10 minutes. Next, 25.0 g (247.3 millimoles) of N-methylmorpholine (organic amine compound) is slowly added to the resultant dispersion and dissolved and reacted for 24 hours while being maintained at a reaction temperature of 60° C., preparing a resin particle dispersed polyimide precursor solution (PAA-1) (resin particle/polyimide precursor=100/35.2 (mass ratio), polyimide precursor concentration in the solution: about 6.6% by mass).

[Preparation of Resin Particle Dispersed Polyimide Precursor Solutions (PAA-2) to (PAA-8)]

Each of resin particle dispersed polyimide precursor solutions (PAA-2) to (PAA-8) for forming a porous polyimide film of each of the examples is prepared by the same method as for preparing the resin particle dispersed polyimide precursor solution (PAA-1) except that the type of the resin particles used is changed according to Table 2.

precursor solution (PAA-9) except that the type of the resin particles used is changed according to Table 2.

[Preparation of Resin Particle Dispersed Polyimide Precursor Solutions (PAA-17) to (PAA-19)]

Each of resin particle dispersed polyimide precursor solutions (PAA-17) to (PAA-19) for forming a porous polyimide film of each of the examples is prepared by the same method as for preparing the resin particle dispersed polyimide precursor solution (PAA-1) or the resin particle dispersed polyimide precursor solution (PAA-9) except that the mass ratio of resin particle/polyimide precursor is changed according to Table 2.

[Preparation of Resin Particle Dispersed Polyimide Precursor Solutions (PAA-R1) to (PAA-R6)]

Each of resin particle dispersed polyimide precursor solutions (PAA-R1) to (PAA-R3) for forming a porous polyimide film of each of the examples is prepared by the same method as for preparing the resin particle dispersed polyimide precursor solution (PAA-1) except that the type of the resin particles is changed according to Table 2.

Also, each of resin particle dispersed polyimide precursor solutions (PAA-R4) to (PAA-R6) for forming a porous polyimide film of each of the examples is prepared by the same method as for preparing the resin particle dispersed polyimide precursor solution (PAA-9) except that the type of the resin particles is changed according to Table 2.

[Preparation of Resin Particle Dispersed Polyimide Precursor Solutions (PAA-R7) to (PAA-R8)]

Each of resin particle dispersed polyimide precursor solutions (PAA-R7) to (PAA-R8) is prepared by the same method as for preparing the resin particle dispersed polyimide precursor solution (PAA-1) or the resin particle dispersed polyimide precursor solution (PAA-2) except that the mass ratio of resin particle/polyimide precursor is changed.

Examples 1 to 19 and Comparative Examples 1 to 8

[Formation of Porous Polyimide Film]

First, an aluminum plate is prepared for forming a coating film of each of the resin particle dispersed polyimide precursor solutions prepared as described above. Then, a solution prepared by dissolving a release agent KS-700 (manufactured by Shin-Etsu Chemical Co., Ltd.) in toluene is applied on the surface of the aluminum plate so that the thickness after drying is about 0.05 μm and then heat-treated at 400° C. to provide a release layer.

Next, the resin particle dispersed polyimide precursor solution is applied on the release layer of the aluminum plate so that the thickness after drying is about 30 μm to form a coating film. The coating film is dried by heating at 90° C. for 1 hour. Then, the coating film is heated from room temperature (25° C., the same applies below) to 390° C. at a rate of 10° C./min, maintained at 390° C. for 1 hour, and then cooled to room temperature to form a porous polyimide film having a thickness of about 30 μm.

(Pore Distribution Width)

The pore distribution width is determined by measuring a pore distribution by a mercury intrusion method according to JIS R 1655(2003) as described above.

(Pore Diameter and Pore Circularity)

The pore diameter (average value of pore diameter) and pore circularity are observed and measured by a scanning electron microscope (SEM).

(Air Permeation Speed)

The formed porous polyimide film is cut to a 1-cm$^2$ square to obtain a sample for air permeation speed measurement. The sample is set to be held between a funnel and a base part of a filter holder for vacuum filtration (manufactured by ADVANTEC Co., Ltd., KGS-04). The filter holder holding the sample is immersed upside down in water, and is filled with water up to a predetermined position of the funnel. An air pressure of 0.5 atm (0.05 MPas) is loaded from the base part on the side not in contact with the funnel, and the time (seconds) taken for air of 50 ml to pass through is measured and evaluated as the air permeation speed.

TABLE 2

|  | PI precursor solution | Resin particle dispersion | Resin particle/PI precursor Mass ratio | PI precursor Tetracarboxylic acid Type | Diamine Type | Organic amine compound Type | Aprotic polar solvent Type |
| --- | --- | --- | --- | --- | --- | --- | --- |
| Example 1 | PAA-1 | 1 | 100/35.2 | BPDA | PDA | MMO |  |
| Example 2 | PAA-2 | 2 | 100/35.2 | BPDA | PDA | MMO |  |
| Example 3 | PAA-3 | 3 | 100/35.2 | BPDA | PDA | MMO |  |
| Example 4 | PAA-4 | 4 | 100/35.2 | BPDA | PDA | MMO |  |
| Example 5 | PAA-5 | 5 | 100/35.2 | BPDA | PDA | MMO |  |
| Example 6 | PAA-6 | 6 | 100/35.2 | BPDA | PDA | MMO |  |
| Example 7 | PAA-7 | 7 | 100/35.2 | BPDA | PDA | MMO |  |
| Example 8 | PAA-8 | 8 | 100/35.2 | BPDA | PDA | MMO |  |
| Example 9 | PAA-9 | 1 | 100/35.2 | BPDA | PDA | MMO | NMP |
| Example 10 | PAA-10 | 2 | 100/35.2 | BPDA | PDA | MMO | NMP |
| Example 11 | PAA-11 | 3 | 100/35.2 | BPDA | PDA | MMO | NMP |
| Example 12 | PAA-12 | 4 | 100/35.2 | BPDA | PDA | MMO | NMP |
| Example 13 | PAA-13 | 5 | 100/35.2 | BPDA | PDA | MMO | NMP |
| Example 14 | PAA-14 | 6 | 100/35.2 | BPDA | PDA | MMO | NMP |
| Example 15 | PAA-15 | 7 | 100/35.2 | BPDA | PDA | MMO | NMP |
| Example 16 | PAA-16 | 8 | 100/35.2 | BPDA | PDA | MMO | NMP |
| Example 17 | PAA-17 | 1 | 100/40 | BPDA | PDA | MMO |  |
| Example 18 | PAA-18 | 1 | 100/43 | BPDA | PDA | MMO |  |
| Example 19 | PAA-19 | 1 | 100/43 | BPDA | PDA | MMO | NMP |
| Comparative Example 1 | PAA-R1 | C1 | 100/35.2 | BPDA | PDA | MMO |  |
| Comparative Example 2 | PAA-R2 | C2 | 100/35.2 | BPDA | PDA | MMO |  |
| Comparative Example 3 | PAA-R3 | C3 | 100/35.2 | BPDA | PDA | MMO |  |
| Comparative Example 4 | PAA-R4 | C1 | 100/35.2 | BPDA | PDA | MMO | NMP |
| Comparative Example 5 | PAA-R5 | C2 | 100/35.2 | BPDA | PDA | MMO | NMP |
| Comparative Example 6 | PAA-R6 | C3 | 100/35.2 | BPDA | PDA | MMO | NMP |
| Comparative Example 7 | PAA-R7 | 1 | 100/60 | BPDA | PDA | MMO |  |
| Comparative Example 8 | PAA-R8 | 1 | 100/60 | BPDA | PDA | MMO | NMP |

Details of abbreviations in Table 2 are described below.
"PI": polyimide
"PDA": p-phenylenediamine
"BPDA": 3,3',4,4'-biphenyltetracarboxylic dianhydride
"MMO": methylmorpholine
"NMP": N-methylpyrrolidone (Void Ratio)

The weight of the formed porous polyimide film is measured, and the thickness is measured according to JIS K7130 (1992). A literature value 1.43 is used as the true specific gravity.

(Cycle Electric Characteristic A)

A lithium ion battery is produced by using the porous polyimide film formed in each of the examples. Next, a decease rate of battery capacity is measured by 500-times repeated charge and discharge (1C charge and 1C discharge at 25° C.). The smaller the decrease rate, the better the cycle characteristics. The decrease rate of less than 20% is evaluated as "good", and the decrease rate of 20% or more is evaluated as "poor".

The materials (the positive electrode active material, the negative electrode active material, and the electrolytic solution) constituting the lithium ion secondary battery are as follows.

Positive electrode active material: NMC 111 (manufactured by Nippon Chemical Industrial Co., Ltd.):acetylene black (manufactured by Kishida Chemical Co., Ltd.):binder (PVdF #1100 manufactured by Kureha Corporation)=(94:3:3)

Negative electrode active material: natural graphite (manufactured by Mitsubishi Chemical Corporation):CMC (MAC350HC, manufactured by Nippon Paper Group, Inc.): binder (TRD2001, manufactured by JSR Corporation): acetylene black (manufactured by Kishida Chemical Co., Ltd.)=(97:1:1.5:0.5)

Electrolytical solution: 1 mol/L LiPF$_6$ ethylene carbonate/ethylmethyl carbonate (=3/7 vol.)+vinylene carbonate 1 wt % (manufactured by Kishida Chemical Co., Ltd.)

(Cycle Electric Characteristic B)

An all-solid-state battery is produced by using the porous polyimide film formed in each of the examples. Next, a decease rate of battery capacity is measured by 500-times repeated charge and discharge (1C charge and 1C discharge at 25° C.). The smaller the decrease rate, the better the cycle characteristics. The decrease rate of less than 20% is evaluated as "good", and the decrease rate of 20% or more is evaluated as "poor".

The materials (the positive electrode active material, the negative electrode active material, and the solid electrolyte) constituting the all-solid-state battery are as follows.

Positive electrode active material: NMC 622:acetylene: binder (PVdF #1100)=(94:3:3)

Negative electrode active material: natural graphite:CMC (MAC350HC):binder (TRD2001):acetylene black=(97:1:1.5:0.5)

Solid electrolyte: $Li_7La_3Zr_2O_{12}$ (LLZ)

TABLE 3

| | Characteristics of porous polyimide film | | | | | Evaluation | |
|---|---|---|---|---|---|---|---|
| | Pore distribution width | Pore diameter μm | Pore circularity | Void ratio % | Air permeation speed seconds | Film thickness μm | Cycle characteristic A | Cycle characteristic B |
| Example 1 | 1.15 | 0.51 | 0.85 | 68 | 27 | 30 | Good | Good |
| Example 2 | 1.15 | 0.66 | 0.86 | 68 | 26 | 40 | Good | Good |
| Example 3 | 1.15 | 0.81 | 0.88 | 69 | 22 | 30 | Good | Good |
| Example 4 | 1.13 | 1.1 | 0.9 | 70 | 19 | 25 | Good | Good |
| Example 5 | 1.12 | 2.3 | 0.92 | 71 | 15 | 35 | Good | Good |
| Example 6 | 1.15 | 2.7 | 0.96 | 73 | 12 | 35 | Good | Good |
| Example 7 | 1.15 | 0.8 | 0.88 | 70 | 23 | 40 | Good | Good |
| Example 8 | 1.15 | 0.8 | 0.88 | 70 | 24 | 40 | Good | Good |
| Example 9 | 1.15 | 0.51 | 0.85 | 68 | 27 | 30 | Good | Good |
| Example 10 | 1.15 | 0.66 | 0.86 | 68 | 26 | 40 | Good | Good |
| Example 11 | 1.15 | 0.81 | 0.88 | 69 | 22 | 30 | Good | Good |
| Example 12 | 1.13 | 1.1 | 0.9 | 70 | 19 | 25 | Good | Good |
| Example 13 | 1.12 | 2.3 | 0.92 | 71 | 15 | 35 | Good | Good |
| Example 14 | 1.15 | 2.7 | 0.96 | 73 | 12 | 35 | Good | Good |
| Example 15 | 1.15 | 0.8 | 0.88 | 70 | 23 | 40 | Good | Good |
| Example 16 | 1.15 | 0.8 | 0.88 | 70 | 24 | 40 | Good | Good |
| Example 17 | 1.15 | 0.51 | 0.85 | 60 | 27 | 30 | Good | Good |
| Example 18 | 1.15 | 0.51 | 0.88 | 51 | 29 | 30 | Good | Good |
| Example 19 | 1.15 | 0.51 | 0.88 | 51 | 29 | 30 | Good | Good |
| Comparative Example 1 | 1.28 | 0.41 | 0.88 | 68 | 60 | 30 | Poor | Poor |
| Comparative Example 2 | 1.33 | 0.51 | 0.85 | 67 | 60 | 30 | Poor | Poor |
| Comparative Example 3 | 1.12 | 3.2 | 0.92 | 73 | 12 | 10 | Poor | Poor |
| Comparative Example 4 | 1.28 | 0.41 | 0.88 | 68 | 60 | 30 | Poor | Poor |
| Comparative Example 5 | 1.33 | 0.51 | 0.85 | 67 | 60 | 30 | Poor | Poor |
| Comparative Example 6 | 1.12 | 3.2 | 0.92 | 73 | 12 | 10 | Poor (with short circuit) | Poor (with short circuit) |
| Comparative Example 7 | 1.15 | 0.51 | 0.85 | 40 | 180 | 30 | Poor | Poor |
| Comparative Example 8 | 1.15 | 0.51 | 0.85 | 40 | 180 | 30 | Poor | Poor |

The results described above indicate that the examples have good cycle characteristics as compared with the comparative examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A porous polyimide film comprising:
the porous polyimide film which has a pore distribution width A of 1.15 or less represented by the following formula, an average pore diameter within a range of 0.50 μm to 3.0 μm, an air permeation speed of 30 seconds or less, and a pore circularity is 0.85 or more, $$A=(D_{84}/D_{16})^{1/2}2$$

wherein $D_{16}$ is a pore diameter at 16% cumulation from a small diameter side of pores, and $D_{84}$ is the pore diameter at 84% cumulation from the small diameter side of pores.

2. The porous polyimide film according to claim 1, wherein the pore distribution width is 1.13 or less.

3. The porous polyimide film according to claim 1, wherein the pore distribution width is 1.12 or less.

4. The porous polyimide film according to claim 1, wherein the average pore diameter is within a range of 0.8 μm to 2.5 μm.

5. The porous polyimide film according to claim 1, wherein the average pore diameter is within a range of 0.8 μm to 2.4 μm.

6. The porous polyimide film according to claim 1, wherein the air permeation speed is 20 seconds or less.

7. The porous polyimide film according to claim 1, wherein the air permeation speed is 15 seconds or less.

8. The porous polyimide film according to claim 1, wherein the pore circularity is 0.90 or more.

9. The porous polyimide film according to claim 1, wherein an average thickness is within a range of 10 μm to 1000 μm.

10. The porous polyimide film according to claim 1, wherein an average thickness is within a range of 20 μm to 500 μm.

11. The porous polyimide film according to claim 1, wherein a void ratio of the film is within a range of 50% to 80%.

12. The porous polyimide film according to claim 1, wherein a void ratio of the film is within a range of 55% to 75%.

13. A lithium ion secondary battery comprising the porous polyimide film according to claim 1.

14. The lithium ion secondary battery according to claim 13, wherein the porous polyimide film is a separator.

15. An all-solid-state battery comprising the porous polyimide film according to claim 1.

* * * * *